US012026956B1

(12) United States Patent
Purdy et al.

(10) Patent No.: US 12,026,956 B1
(45) Date of Patent: Jul. 2, 2024

(54) OBJECT BOUNDING CONTOURS BASED ON IMAGE DATA

(71) Applicant: Zoox, Inc., Foster City, CA (US)

(72) Inventors: Scott M. Purdy, Lake Forest Park, WA (US); Subhasis Das, Menlo Park, CA (US); Derek Xiang Ma, San Carlos, CA (US); Zeng Wang, Menlo Park, CA (US)

(73) Assignee: Zoox, Inc., Foster City, CA (US)

( * ) Notice: Subject to any disclaimer, the term of this patent is extended or adjusted under 35 U.S.C. 154(b) by 251 days.

(21) Appl. No.: 17/513,674

(22) Filed: Oct. 28, 2021

(51) Int. Cl.
| G06K 9/00 | (2022.01) |
| B60W 60/00 | (2020.01) |
| G01S 17/931 | (2020.01) |
| G06T 7/20 | (2017.01) |
| G06T 7/50 | (2017.01) |

(Continued)

(52) U.S. Cl.
CPC .......... *G06V 20/58* (2022.01); *B60W 60/0015* (2020.02); *B60W 60/0027* (2020.02); *G01S 17/931* (2020.01); *G06T 7/20* (2013.01); *G06T 7/50* (2017.01); *G06V 10/44* (2022.01); *B60W 2420/403* (2013.01); *B60W 2420/408* (2024.01); *B60W 2554/404* (2020.02);

(Continued)

(58) Field of Classification Search
CPC .......... G06V 20/58; G06V 10/44; G06T 7/20; G06T 7/50; G06T 2207/10028; G06T 2207/30241; G06T 2207/30261; B60W 2420/52

See application file for complete search history.

(56) References Cited

U.S. PATENT DOCUMENTS

| 11,087,494 | B1* | 8/2021 | Srinivasan | ............... G01S 17/89 |
| 2009/0292468 | A1* | 11/2009 | Wu | ........................ G08G 1/165 |
| | | | | 342/146 |

(Continued)

FOREIGN PATENT DOCUMENTS

| CN | 109166144 A | * | 1/2019 | ................ G06T 7/50 |
| CN | 110443843 A | * | 11/2019 | ............ G06N 3/0454 |

(Continued)

OTHER PUBLICATIONS

A General Pipeline for 3D Detection of Vehicles, Xinxin Du et al., IEEE, 2018, pp. 3194-3200 (Year: 2018).*

(Continued)

*Primary Examiner* — Jayesh A Patel
(74) *Attorney, Agent, or Firm* — Lee & Hayes, P.C.

(57) ABSTRACT

Techniques are discussed herein for controlling autonomous vehicles within a driving environment, including generating and using bounding contours associated with objects detected in the environment. Image data may be captured and analyzed to identify and/or classify objects within the environment. Image-based and/or lidar-based techniques may be used to determine depth data associated with the objects, and a bounding contour may be determined based on the object boundaries and associated depth data. An autonomous vehicle may use the bounding contours of objects within the environment to classify the objects, predict the positions, poses, and trajectories of the objects, and determine trajectories and perform other vehicle control actions while safely navigating the environment.

20 Claims, 7 Drawing Sheets

(51) Int. Cl.
*G06V 10/44* (2022.01)
*G06V 20/58* (2022.01)

(52) U.S. Cl.
CPC .............. *G06T 2207/10028* (2013.01); *G06T 2207/30241* (2013.01); *G06T 2207/30261* (2013.01)

(56) References Cited

U.S. PATENT DOCUMENTS

| | | | | |
|---|---|---|---|---|
| 2018/0322640 | A1* | 11/2018 | Kim | G05D 1/024 |
| 2018/0348346 | A1* | 12/2018 | Vallespi-Gonzalez | G01S 7/4802 |
| 2019/0012548 | A1* | 1/2019 | Levi | G06T 7/73 |
| 2019/0065864 | A1* | 2/2019 | Yu | G06V 10/764 |
| 2020/0027229 | A1* | 1/2020 | Shen | G01S 17/931 |
| 2020/0159222 | A1* | 5/2020 | Mao | G06T 7/593 |
| 2021/0063578 | A1* | 3/2021 | Wekel | G01S 7/481 |
| 2022/0057806 | A1* | 2/2022 | Guo | G06V 20/58 |
| 2022/0092291 | A1* | 3/2022 | Lai | G06V 20/70 |

FOREIGN PATENT DOCUMENTS

| | | | | |
|---|---|---|---|---|
| EP | 3525000 | A1 * | 8/2019 | ............. G01S 13/42 |
| EP | 3716137 | A1 * | 9/2020 | |
| WO | WO-2019025035 | A1 * | 2/2019 | ............. B60R 11/04 |
| WO | WO-2021201774 | A1 * | 10/2021 | |

OTHER PUBLICATIONS

Vehicle Detection Based on LiDAR and Camera Fusion, Feihu Zhang et al., IEEE, 2014, pp. 1620-1625 (Year: 2014).*

3D Objects Detection in an Autonomous Car Driving Problem, Anton Agafonov et al., IEEE, 2020, pp. 1-5 (Year: 2020).*

Pedestrian recognition and tracking using 3D LiDAR for autonomous vehicle, Heng Wang et al., Elsevier, 2017, pp. 71-78 (Year: 2017).*

* cited by examiner

OBJECT BOUNDING CONTOURS BASED ON IMAGE DATA

BACKGROUND

Autonomous vehicles may capture and use various sensor data to detect objects and determine routes through physical environments. For instance, an autonomous vehicle may utilize object detection, prediction, and route planning techniques to control the vehicle when traversing an environment that includes static and dynamic objects. As an autonomous vehicle encounters objects in an environment, such as other vehicles, pedestrians, animals, and the like, the vehicle may make decisions responsive to the objects to ensure the safety of the passengers, the objects, and the surrounding environment. For example, when attempting to safely navigate past a particular object in the environment, a vehicle may determine a location, type, size, and shape of the object. Receiving accurate and precise sensor data, as well as performing accurate analyses of the sensor data, can assist the autonomous vehicle to better understand and respond to the objects in the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
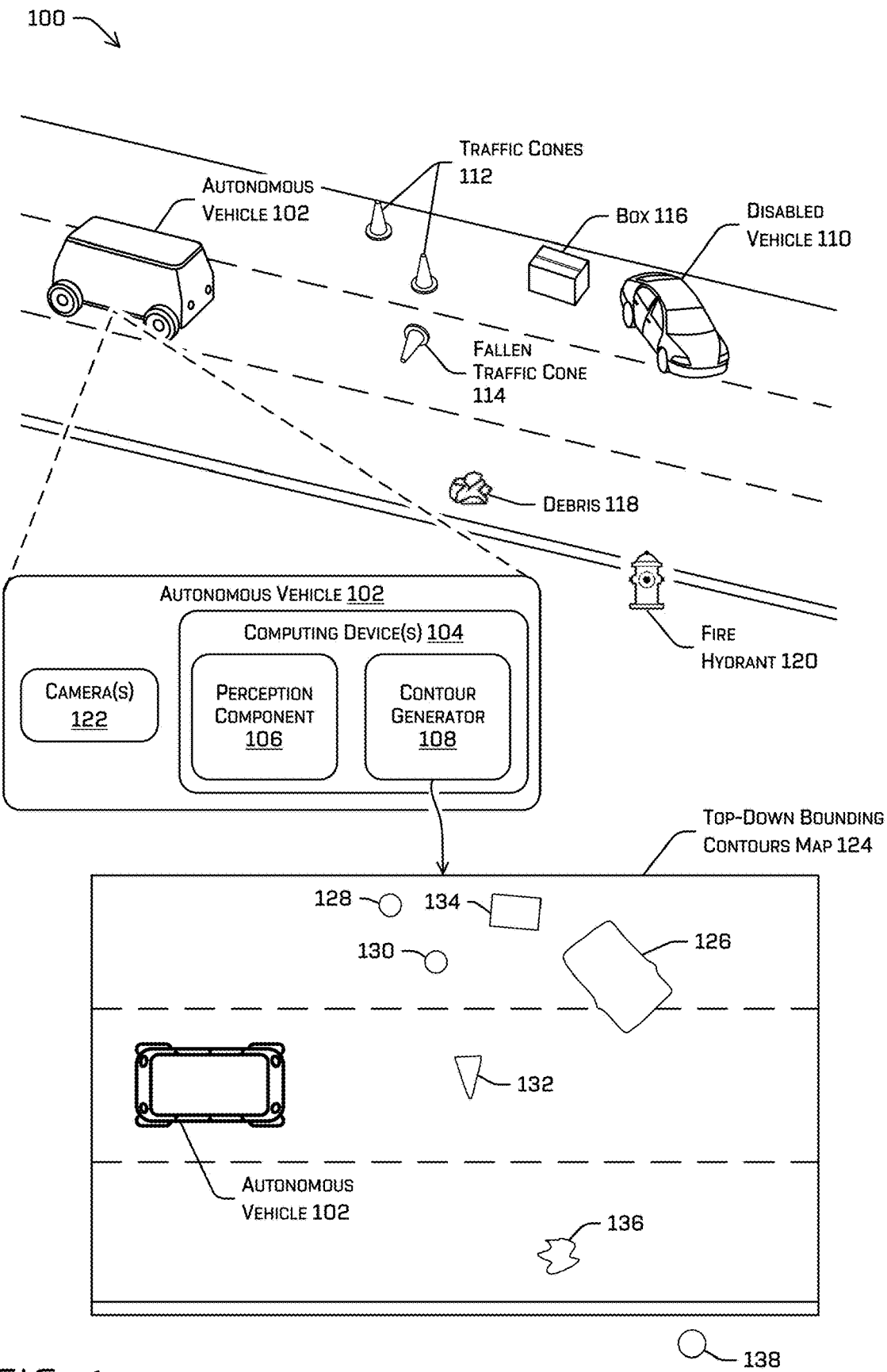
FIG. 1 illustrates an example driving scenario in which an autonomous vehicle generates bounding contours for objects encountered in an environment, in accordance with one or more implementations of the disclosure.

Various techniques described herein relate to generating and using bounding contours associated with objects detected in an environment, to control autonomous vehicles navigating within the environment. In various examples described herein, an autonomous vehicle traversing an environment may use image sensors (e.g., cameras) to capture image data representing objects in the environment. The autonomous vehicle may use image-based object detection operations to detect, identify, and/or classify the object. Depth data associated with a detected object may be determined using various techniques, including but not limited to image-based depth data, lidar depth data, etc. Bounding contours may be determined for objects detected in the environment, based on the object boundaries and the associated depth data, and the autonomous vehicle may use the bounding contours for objects to determine trajectories and perform other vehicle control actions while safely navigating the environment.

While navigating driving environments, autonomous vehicles may use various sensors to capture sensor data associated with the environment. Sensor data, such as image data, radar data, lidar data, etc., may be associated with and may identify various objects within the environment. The objects encountered within an environment can include dynamic objects that are moving or capable of movement (e.g., vehicles, motorcycles, bicycles, pedestrians, animals, etc.), and/or static objects (e.g., buildings, road surfaces, trees, signs, barriers, parked vehicles, etc.). In some instances, the autonomous vehicles may include components configured to determine information about the objects in the environment, such as components to identify objects and determine bounding boxes, perform object classifications, determine segmentation information, and the like. For example, a segmentation component or operation may identify a portion of sensor data as being attributable to a particular object, and a bounding box component or operation may generate a bounding box associated with the particular object.

Bounding boxes may be provided to downstream processing components within the autonomous vehicle and may be useful for semantic classification of the object, as well as for more detailed analysis of the object's position, pose, and trajectory by the prediction and planning components of the autonomous vehicle. Examples of techniques for determining bounding boxes based on image data can be found, for example, in U.S. Pat. No. 10,733,441, filed May 23, 2019, issued Aug. 4, 2020, and titled "Three Dimensional Bounding Box Estimation From Two Dimensional Images," Collision Avoidance Using An Object Contour," and in U.S. Pat. No. 11,010,907, filed Nov. 27, 2018, issued May 18, 2021, and titled "Bounding Box Selection, each of which is incorporated by reference herein, in its entirety for all purposes.

However, bounding boxes may fail to provide a detailed or accurate representation of the size and shape of an object. For instance, bounding boxes are often generated as four-sided rectangles based on the outer edges of an object in a two-dimensional plane. The basic rectangular shape of bounding boxes might not accurately represent the size or shape of the object, since the rectangle must be expanded to include the entire object. If a vehicle has a protrusion from one portion of its surface, such as large side mirrors, a roof rack, a flag or large antenna, a load with rear overhang beyond the trunk or truck bed, etc., then a bounding box generated based on a vehicle would be expanded to fit the protrusion, which can result in the bounding box being significantly larger than the actual vehicle.

To address the problems and limitations of bounding boxes, various techniques described herein include generating bounding contours associated with objects detected in an environment. As used herein, a bounding contour may refer to a geometric shape (e.g., a polygon or closed freeform shape) generated based on a detected object. In various examples, bounding contours may include various different types of simple polygons. In some cases, bounding contours may be non-rectangular simple polygons, unlike rectangular bounding boxes. Such bounding contours may have three sides, four (non-rectangular) sides, may include five or more sides. In some examples, the sides of a bounding contour may be straight or curved, and certain bounding contours may be partially or entirely freeform polygons. For any of these examples, a bounding contour may be a closed and non-self-intersecting polygon which tracks or follows the outer surface of an object, including any irregularities in the shape of the object or protrusions from the object. By using freeform shapes and/or multi-sided polygons, a bounding contour may provide a tighter fit and more accurate representation of the object, in contrast to rectangular bounding boxes.

In various examples, bounding counters may be represented as two-dimensional and/or as three-dimension polygons. In some cases, bounding counters may be represented as two-dimensional (2D) simple polygons within a top-down view of an environment. In such cases, the boundaries of the 2D bounding contour may correspond to the outer edges (or perimeter) of the object. For 2D bounding contour representations, in some examples the bounding contour also may include an object height value associated with the 2D top-down bounding contour representation. In still other cases, bounding counters may be represented as three-dimensional (3D) closed polygons.

Different types of bounding counters also may be used in different implementations, and/or may be used for different objects detected within the same environment. For instance, in some cases an autonomous vehicle may generate bounding boxes for certain objects (e.g., dynamic objects) and may generate bounding contour for different objects (e.g., static objects). In other examples, an autonomous vehicle may generate different types of bounding boxes and/or bounding contours (e.g., 2D simple polygons, 2D simple polygons plus a height, freeform shapes, 3D polygons, etc.), for objects having different characteristics (e.g., static versus dynamic objects, different object classifications/types, etc.).

Further techniques described herein include capturing and using image data, alone or in combination with additional sensor data, to generate and use bounding contours associated with objects. For example, in contrast to systems that use lidar data only (or other non-image sensor data), techniques using image data to determine bounding contours may provide various advantages resulting from more accurate bounding contours in a more efficient and flexible manner. For instance, image data may provide greater resolution than lidar or other types of sensor data, so that the autonomous vehicle may determine bounding contours for smaller objects, including objects low to the ground which may be difficult to distinguish using lidar data only. Therefore, image-based bounding contour generation techniques may provide improvements in detecting and contouring objects such as traffic or construction objects, road debris, potholes, etc. Additionally, capturing and using image data to generate bounding contours provides advantages in object classification, where the image data may be provided to trained convolutional neural networks (CNNs) and other image-based object identification and classification components configured to operate based on light/color pixel data.

Various examples of techniques are described herein for using image data to generate bounding contours associated with objects detected in an environment. In some examples, a contour generator may use entirely image-based techniques to identify and/or detect an object, and to obtain depth data associated with the object. As described below in more detail, a contour generator may use image-based object depth models and/or depth estimation algorithms to determine per pixel depths based on the captured images. In other examples, the contour generator may use image data for segmentation to determine the boundaries of the object, and then may project lidar data onto the two-dimensional plane of the image data, thereby determining the depth data for the object based on the projected lidar data. In various other examples, combinations of image-based techniques and lidar-based techniques (and/or corresponding techniques for other sensor data types) may be used to determine object boundaries, object depth data, and/or object classifications to generate bounding contours for objects. Additionally or alternatively, in some instances a contour generator may determine based on image data and/or other sensor data that a bounding contour need not be generated for certain objects. For instance, for unclassified (and/or unclassifiable) objects such as road debris, potholes, partially obscured objects, etc., the contour generator may bound the region associated with the object and designate the region as undrivable, rather than generating a bounding contour for the unclassified object.

In some examples, generating a bounding contour for an object identified in an environment may include a process of identifying and replacing boundary edges of the object, with line segments representing a tighter-fitting perimeter of an object. The bounding contour can be used, for example, in a planning component of a vehicle to determine whether the vehicle is likely to collide with the object represented by the bounding contour. For example, when replacing a boundary edge of the object, the boundary edge may have a first endpoint and a second endpoint. An interior point within the boundary edge may be identified. In some examples, the longest boundary edge may be replaced with 1) a first segment based on the first endpoint and the interior point, and 2) a second segment based on the interior point and the second endpoint. An update bounding contour representation can be determined as an updated simple polygon in which the boundary edge is replaced by the first segment and the second segment. The process of serially replacing the boundary edges can generate a bounding contour that more closely represents the perimeter of the associated object. Additional examples of techniques for generating and using bounding contours associated with objects detected in an environment can be found, for example, in U.S. patent application Ser. No. 17/138,710, filed Dec. 30, 2020, and titled "Collision Avoidance Using An Object Contour," and in U.S. patent application Ser. No. 17/138,751, filed Dec. 30, 2020, and titled "Object Contour Determination," both of which are incorporated by reference herein, in its entirety for all purposes.

As described in these examples and others, the techniques described herein may provide technical advantages that improve vehicle safety and efficiency of vehicle navigation in real-world driving environments. Generating improved and more accurate bounding contours for the objects in the environment, may permit the autonomous vehicle to determine routes more safely, and navigate around potential road hazards more effectively.

FIG. 1 depicts an example driving scenario 100, in which an autonomous vehicle 102 within a driving environment uses various techniques to detect object and generate bounding contours associated with the objects. In some instances, the autonomous vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 102 may be a fully or partially autonomous vehicle having any other level or classification. It is contemplated that the techniques discussed herein may apply to more than robotic control, such as for autonomous vehicles. For example, the techniques discussed herein may be applied to pathfinding in video games, manufacturing, augmented reality, etc.

As shown in this example, the autonomous vehicle 102 may comprise computing device(s) 104 that may include a perception component 106 and a contour generator 108. In some examples, the perception component 106 may be configured to use convolutional neural networks (CNNs) and/or other machine learning models to detect and classify objects based on sensor data captured by the autonomous vehicle 102. The contour generator 108 may use output data from the models of the perception component 106 to determine and generate bounding contours associated with the objects. Although the perception component 106 and contour generator 108 are shown as separate objects in this example, in other examples the contour generator 108 may be implemented as one or more subcomponents within the perception component 106. In some examples, the perception component 106 and/or contour generator 108 may include the hardware and/or software for conducting the operations discussed herein related to generating bounding contours.

As noted above, the perception component 106 and/or contour generator 108 may use machine-learned models, CNNs, and/or other neural networks, to perform object identification, classification, instance segmentation, semantic segmentation, and/or object tracking, etc. As described herein, an exemplary neural network is a biologically inspired algorithm that passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters. Although discussed in the context of neural networks, any type of machine learning can be used consistent with this disclosure. In some examples, the perception component 106 and/or contour generator 108 may include processor-executable instructions stored in a memory of the computing device(s) 104 and/or accessible thereto, hardware, and/or some combination thereof (e.g., a field-programmable gate array (FPGA), application-specific integrated circuit (ASIC)).

In the example driving scenario 100, the autonomous vehicle 102 is traversing a driving environment and is approaching a disabled vehicle 110 along with various other objects on the road. In addition to the disabled vehicle 110 blocking one lane and part of another, the environment includes two traffic cones 112, a third fallen traffic cone 114, and a box 116 associated with the disabled vehicle 110. Additionally, on the other side of the road, the environment includes a piece of road debris 118, and a fire hydrant 120.

As the autonomous vehicle perceives the objects in the driving scenario 100, the perception component 106 may attempt to identify, distinguish, and classify the various objects. In some examples, the perception component 106 may receive image data from one or more cameras 122, and perform image segmentation on the data to identify the distinct objects in the environment from the image data. The image segmentation performed by the autonomous vehicle 102 may include machine learning algorithms, deep learning, and/or may utilize artificial neural networks (e.g., CNNs) to perform the segmentation and/or classification of objects represented in the sensor data. Examples of image-based data segmentation techniques can be found, for example, in U.S. Pat. No. 10,535,138, filed Nov. 21, 2017, issued Jan. 14, 2020, and titled "Sensor Data Segmentation," and in U.S. Pat. No. 10,817,740, filed Jun. 20, 2018, issued Oct. 27, 2020, and titled "Instance Segmentation Inferred From Machine Learning Output." Each of U.S. Pat. Nos. 10,535,138 and 10,817,740 is incorporated by reference herein, in its entirety for all purposes.

The autonomous vehicle 102 also may perform various image-based object detection techniques for identifying the objects 110-120 within the environment. In certain techniques, machine-learned models may be used to detect a portion of an object within a region of interest, and determining an object type, subtype(s), and/or attributes based on the output of the machine-learned models. Examples of techniques of image-based object classification can be found, for example, in U.S. patent application Ser. No. 16/587,605, filed Sep. 30, 2019, and titled "Perception System, in U.S. patent application Ser. No. 16/726,097, filed Dec. 23, 2019, and titled "Pedestrian Object Detection Training," in U.S. patent application Ser. No. 16/797,656, filed Feb. 21, 2020, and titled "Combined Track Confidence And Classification Model," and in U.S. patent application Ser. No. 16/457,524, filed Jun. 28, 2019, and titled "Head Detection For Improved Pedestrian Detection." Each of U.S. patent application Ser. Nos. 16/587,605, 16/726,097, 16/797,656, and 16/457,524, is incorporated by reference herein, in its entirety for all purposes.

Additionally, in some instances, as part of object classification, and/or based on determining whether an object is static or dynamic, the autonomous vehicle 102 may also track the positions, poses, velocities, accelerations, and trajectories of the objects encountered in the environment, which may be used to predict future object trajectories and behaviors. As used herein, references to a "position" may comprise both a location and/or a pose (e.g., position and/or orientation/heading of a dynamic object or the autonomous vehicle 102). Examples of analyzing image data and/or multi-model sensor data to perform object tracking using trained machine-learned models can be found, for example, in U.S. patent application Ser. No. 16/866,865, filed Jan. 31, 2020, and titled "Object Detection And Tracking," and in U.S. Pat. No. 10,671,076, filed Dec. 6, 2017, issued Jun. 2, 2020, and titled "Trajectory Prediction Of Third-Part Objects Using Temporal Logic And Tree Search. Each of U.S. patent application Ser. No. 16/866,865, and 10,671,076 is incorporated by reference herein, in its entirety for all purposes.

In this example, when the autonomous vehicle 102 encounters driving scenario 100, it may use the contour generator 108 to determine bounding contours associated with the objects 110-120 in the environment. In this example, a number of two-dimensional, top-down bounding contours are shown in the top-down bounding contours map 124. As this example shows, by generating top-down bounding contours associated with the objects 110-120, the autonomous vehicle 102 may be able to use the bounding contours to predict various object behaviors and trajectories, and for planning a trajectory and route for the autonomous vehicle 102 to traverse the environment.

As noted above, a bounding contour may refer to a geometric shape (e.g., a polygon or freeform shape) based on a detected object, in which the boundaries of the contour may correspond to the outer edges (or perimeter) of the object. As shown in this example, bounding contours may include polygons having five or more sides, and/or freeform shapes, to more accurately depict the irregularities in or protrusions from the object. In this example, the top-down bounding contours map 124 includes a contour 126 based on the disabled vehicle 110, contour 128 and contour 130 based on traffic cones 112, contour 130 based on the fallen traffic cone 114, contour 134 based on the box 116, contour 136 based on the road debris 118, and contour 138 based on the fire hydrant 120.

To generate a bounding contour for an object, the contour generator 108 may determine (or estimate) the outer edges of the object, and then may construct the bounding contour using the depth data within the boundary region of the object. For example, the depth data received or captured by the autonomous vehicle 102 for an object may include distance values between one or more sensors on the autonomous vehicle 102 and various points on the surface of the object. The contour generator 108 may transform the depth data into points on an X-Y plane corresponding to the road surface, and then may generate the bounding contour as a top-down (e.g., axis shifted) representation of the depth data for the object. For top-down bounding contours, the contour generator 108 may use the depth data to identify the widest points around the circumference of the object, so that the contours are accurate representations of the outline of the object from the top-down perspective, including any irregularities or protruding portions of the object. For example, the contour 126 associated with the disabled vehicle 110 boughs out slightly along each side, based on the side mirrors that protrude outward from the driver and passenger door of the vehicle. As another example, contour 132 has a different shape in the top-down view than contour 128 or contour 130, reflecting that fallen traffic cone 114 is on its side while the traffic cones 112 are upright.

As this example illustrates, it may be advantageous in some cases to generate bounding contours as top-down views. For instance, the autonomous vehicle 102 may use top-down bounding contours to classify objects, track objects, and predict the future position, pose, and trajectory of objects. The autonomous vehicle 102 also may use top-down bounding contours to determine safe and efficient routes through the environment. By using the more accurate and tighter fitting bounding contours, which may take into account any object irregularities and/or protrusions from the objects, the autonomous vehicle 102 may more effectively avoid delays or potential safety hazards.

Although the bounding contours in this example are shown as top-down contours following the widest points around the circumference of their respective objects, it can be understood from the context of this disclosure that the contour generator 108 may use object boundaries and object depth data to construct various other types of bounding contours. The contour generator 108 may generate side-view bounding contours instead of or in addition to top-down bounding contours in various examples, and either side-view or top-down contours (or contours from other perspective angles) may be used by the autonomous vehicle 102 for prediction and planning. For instance, using side-view bounding contours, the autonomous vehicle 102 may determine that a large object protruding from a truck bed can be safely driven under. Additionally or alternatively, the contour generator 108 may generate multiple top-down bounding contours, multiple side-view bounding contours, and/or 3D bounding contours associated with an object. As an example, the contour generator 108 may generate multiple top-down bounding contours for an object, where each top-down contour corresponds to a different height (e.g., at six-inch intervals, one-foot intervals, etc.) between the ground and the top of the object. Each of these examples of bounding contours may be used by the autonomous vehicle 102 to further enhance object classification, object prediction, object tracking, and trajectory/route planning by the autonomous vehicle 102.

As shown in this example, a bounding contour may be generated as a closed shape, such as a closed polygon or closed free form shape. In various other examples, bounding contours may be generated either as closed or open shapes. For example, when the autonomous vehicle 102 does not have sensor data for all sides of the object, and/or when the hidden sides or other obscured portions of the object cannot be predicted (e.g., using object classification and/or object depth models), then the bounding contour for the object may be a partial or open contour.

The contour generator 108 may use various different techniques for determining depth data associated with an object, from which bounding contours can be constructed. For instance, to determine depth data for an object, the contour generator 108 may use one or more image-based per pixel depth estimation algorithms, image-based object classification along with corresponding object depth models, lidar-based depth data, and/or any combination of the depth data techniques described herein. In some examples, image-based object classification may be used to classify the object into one or more object types or sub-types, and/or to determine attributes of the object. Image-based classification techniques may be especially valuable for smaller objects and/or objects near to the ground. For instance, image-based classification may use the higher resolution image data (e.g., pixel data) and color data to determine various types of objects that techniques based on other types of sensor data (e.g., lidar or radar) may be unable to detect or classify. For instance, image-based object classification may be used to detect and/or classify traffic cones 112 and 114, box 116, road debris 118, and fire hydrant 120, based on the size, shape, and color of these objects. Other examples of object types classifiable based on image data may include sporting equipment (e.g., footballs, soccer balls, basketballs, baseballs, bats, helmets, bicycles, skateboards, etc.), tumbleweeds, branches, garbage bags, shopping/grocery bags, mattresses and/or other furniture, etc.

As described below in more detail, when an object is classified into an object type (or a subtype, having particular attributes, etc.), the contour generator 108 may use the object classification to determine precise object boundaries, after which depth data based on image and/or other sources (e.g., lidar) can be received to correspond to the object boundaries. Additionally, certain object types or classifications may have associated depth models. For instance, after using image-based techniques to classify an object (e.g., a traffic cone, a football, a skateboard, etc.), the contour generator 108 may use the associated depth model to determine a three-dimensional representation of the object from which the object depth data may be determined. Thus, the bounding contours for a classified object may be generated as fully closed geometric shapes, even when the back side or other portions of the object are hidden from the sensors of the autonomous vehicle 102. As an example, because the fallen traffic cone 114 can be identified successfully using image-based classification, the contour 132 can be generated as a fully closed shape that accurately represents the fallen traffic cone 114, even when the autonomous vehicle 102 can only perceive the object from the front. In some examples, the perception component 106 and/or contour generator 108 may include separate object depth models storing 3D representations and/or other depth data for any of the object types described herein (e.g., traffic cones, lane markers, sports equipment, bags, etc.).

When image-based object classification is not used, or when an object cannot be confidently classified (e.g., having a confidence level below a classification confidence threshold), then the contour generator 108 may generate a bounding contour for the unclassified object, or might not generate a bounding contour in some instances. As described below, for objects like potholes, road debris, and/or other unclassifiable objects, the contour generator 108 may still use various different depth data techniques (e.g., image-based per pixel depth estimation, lidar, radar, etc.) to determine bounding contours. In some cases, the bounding contours for unclassified objects may be open or unknown for sides or portions of the object that cannot be observed by the sensors of the autonomous vehicle. In other examples, the contour generator 108 may determine object boundaries for an unclassified object, and may designate the object boundaries as an undrivable region for the autonomous vehicle 102. In such examples, the contour generator 108 need not determine depth data or construct a bounding contour for the object.

Figure 2:
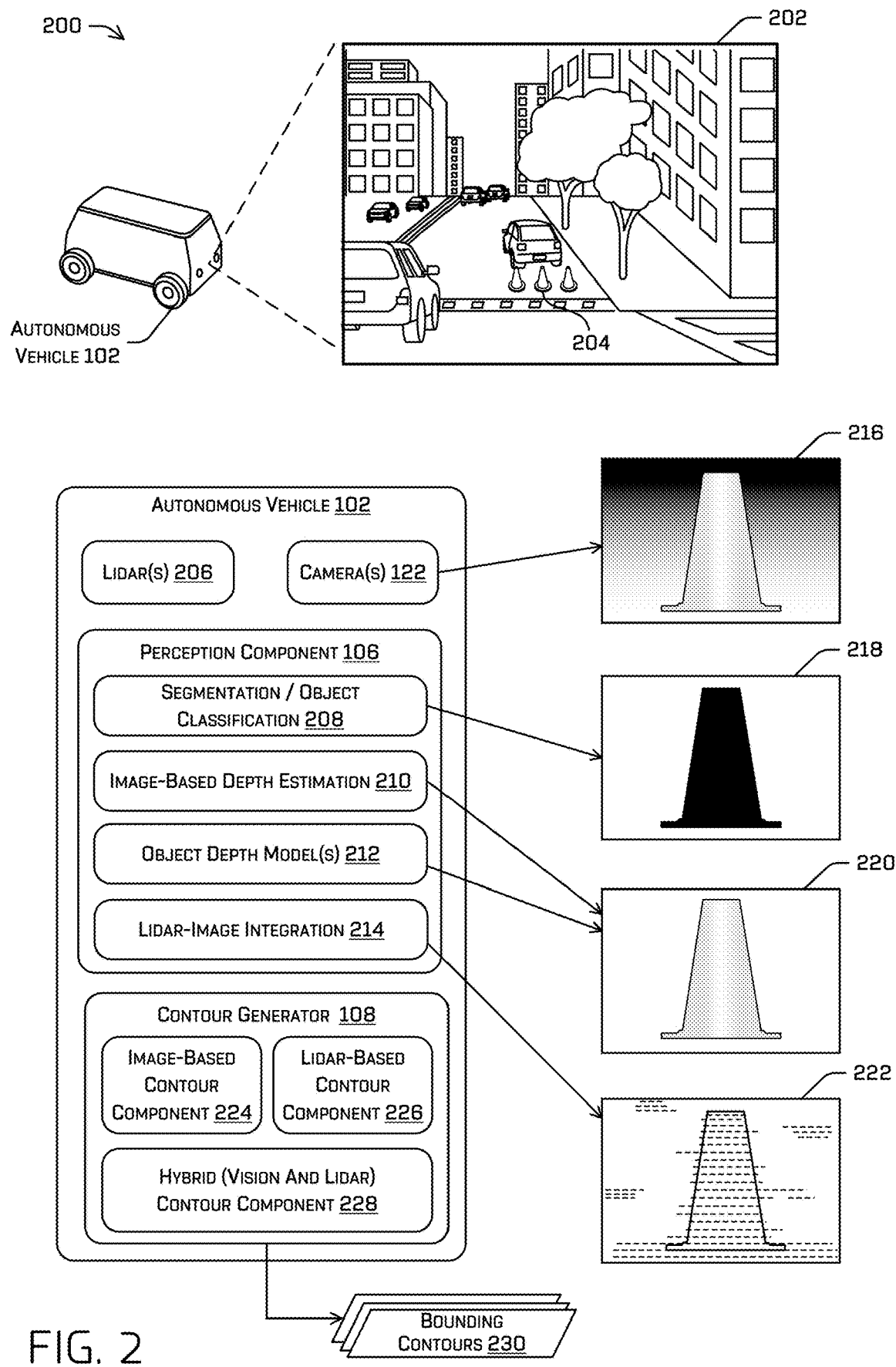
FIG. 2 illustrates an example system and various techniques for generating bounding contours for an object, based on image and lidar data analyses, in accordance with one or more implementations of the disclosure.

FIG. 2 is a diagram showing an example driving environment 200 and illustrating various techniques in which an autonomous vehicle 102 may determine bounding contours for an object detected within an environment. In this example, the autonomous vehicle 102 is navigating a driving environment 200 including three traffic cones 204 blocking an upcoming lane. As described below, the autonomous vehicle 102 may include sensors and components configured to detect, classify, and/or generate a bounding contour for a traffic cone within the driving environment 200. However, it can be understood from the context of this disclosure that similar or identical techniques can be used to generate bounding contours for any other type of object detected in an environment.

As shown in this example, the autonomous vehicle 102 may receive sensor data representing the driving environment 200 from various sensors, such as cameras 122 and/or lidar sensors. Although only cameras 122 and lidar sensors 206 are depicted in this example, in other examples any other types of sensors may be used to capture sensor data of the driving environment 200. The autonomous vehicle 102 also may include a perception component 106 and contour generator 108, which may be similar or identical to the corresponding components described above in reference to FIG. 1. As noted above, the contour generator 108 may be integrated within the perception component 106 in some implementations, and any of the components depicted within the perception component 106 may be implemented within the contour generator 108, or vice versa.

As noted above, the perception component 106 may include various components configured to process the sensor data received from cameras 122 and lidar sensors 206 (among other sensor data), and to identify, classify, analyze, segment, and track various objects detected within the environment. In this example, the perception component 106 includes a segmentation/object classification component 208, which may be configured to perform object detection, instance segmentation, semantic segmentation, and/or object classification, using any combination of the techniques described herein.

The perception component 106 also includes a number of components configured to determine depth data for objects identified and/or classified by the segmentation/object classification component 208. In this example, each of the image-based depth estimation component 210, the object depth model component 212, and the lidar-image integration component 214 may be configured to determine depth data for an object or region of interest in the driving environment 200. In various examples, the contour generator 108 may use any of these components, alone or in any combination, to determine the depth data associated with an object detected in the driving environment 200.

As shown in this example, the camera(s) 122 and/or sensors of the autonomous vehicle 102 have captured sensor data representing an object (e.g., one of the traffic cones 204) in the driving environment 200. Image 216 represents image data captured by the camera(s) 122, and shows one angle of a traffic cone depicted within a 2D image plane. Portions of image 216 also may include the ground and one or more foreground or background objects that are separate from the traffic cone.

Segmented image 218 may represent an output of the segmentation/object classification component 208. In this example, the segmentation/object classification component 208 has analyzed the visual data within image 216 (and/or other sensor data), to identify and/or classify the traffic cone within image 216. As shown in the segmented image 218, segmentation techniques may be performed to distinguish (e.g., at the pixel level) the portions of image 216 associated with the traffic cone and the portions that are not associated with the traffic cone. These segmented portions may define the precise boundaries of the traffic cone in the 2D image place, as shown in the segmented image 218.

The visual depth data image 220 shows the traffic cone within the 2D image place, and includes shading to represent depth data associated with the traffic cone, determined by the image-based depth estimation component 210 and/or the object depth model component 212. Accordingly, in this example, the visual depth data image 220 may include depth data associated with the particular object (e.g., without depth data for the ground or other objects), based on the visual data captured by the camera(s) 122. The depth data associated with the traffic cone in this example may be generated using image-based depth estimation algorithms and/or object depth models (described in more detail below), and need not rely on data from lidar sensors 206 and/or any sensors other than the camera(s) 122.

The image-based depth estimation component 210 may be configured to receive visual input data of an object (e.g., image 216) and to determine and output depth data (e.g., visual depth data image 220) associated with the object. In some examples, the image-based depth estimation component 210 may include machine learning models and/or algorithms trained to determine depth estimates for each pixel in the image 216. The image-based depth estimation component 210 may use models and algorithms trained based on lidar and/or radar ground truth data, and/or may be configured based on heuristic-based rules regarding object size averages and distributions (e.g., average lengths for cars, trucks, and bicycles, average height and height distributions for pedestrians, standard sizes for traffic signs, lane markings, sidewalk widths, etc.). Additionally or alternatively, the image-based depth estimation component 210 may input image data (e.g., image 216) into a machine-learned algorithm or model that has been trained with training image data and training depth data (e.g., lidar data) as ground truth data. Examples of various techniques for training and using machine-learned models and algorithms to determine estimated depth data and associated confidence values for each pixel within the image data can be found, for example, in U.S. patent application Ser. No. 15/803,682, filed Nov. 3, 2017, and titled "Radar False Negative Analysis," which was granted on Mar. 3, 2020, as U.S. Pat. No. 10,580,158. Additional examples of techniques for training and using machine-learned models and algorithms to determine estimated depth data based on image data and localization and/or map data can be found, for example, in U.S. patent application Ser. No. 16/408,407, filed May 9, 2019, and titled "Image-Based Depth Data and Localization." Examples of further techniques for determining object depths with an environment by taking into account attributes in the environment can be found, for example, in U.S. patent application Ser. No. 16/452,304, filed Jun. 25, 2019, and titled "Refining Depth From An Image." Each of U.S. patent application Ser. Nos. 15/803,682, 16/408,407, and 16/452,304 are incorporated by reference herein, in their entirety for all purposes. The image-based depth estimation component 210 may use any of the techniques described in these applications, alone or in combination, to determine the depth data for the object (e.g., visual depth data image 220).

The object depth model component 212 may be used alternatively, or in addition to, any of the other techniques described herein for determining depth data. As noted above, the object depth model component 212 may include a number of depth models (e.g., 3D representations and/or other depth data) associated with particular object types/classifications. Each object depth model may be associated with an object class (e.g., an object type, subtype, or object attribute(s)), and may be used to predict depth data based on the object class. After one or more object types are determined by the segmentation/object classification component 208, object depth model(s) associated with the object type(s) may be retrieved and used to determine depth data for the object. An object depth model may include a 3D representation of the object and/or other object attributes from with depth data can be determined. As an example, when the object in image 216 is classified as a traffic cone, an object depth model associated with the traffic cone object type can be retrieved, including a 3D representation of a similar or identical traffic cone from which the perception component 106 can determine accurate depth data of the object from every angle. In other examples, when an is classified as a box, a ball, a skateboard, a bicycle, a vehicle, or any other object described herein, an associated depth model may be retrieved based on the object type, to provide a 3D representation or other object depth data.

In some cases, even when the segmentation/object classification component 208 is unable to determine an object type (e.g., the confidence level of a predicted object type is less than a minimum confidence threshold), the classification model may still determine various object attributes with a sufficiently high confidence level. For instance, even when an object cannot be classified, a classification model may determine whether or not the object is likely to be symmetrical, whether the object is likely to be static or dynamic, etc. In contrast, if the object is classified as a fallen branch, pothole, road debris, etc., then the corresponding object depth models may indicate that the object is asymmetrical, and a 3D representation might not be available to accurately model the object.

A lidar depth data image 222, as shown in this example may include depth data based on lidar data received from lidar sensors 206. For example, a lidar-image integration component 214 may receive a lidar point cloud from the lidar sensor(s) 206, and project the lidar point cloud onto the two-dimensional plane of the image 216. After projecting the lidar point cloud onto the 2D image plane, the lidar-image integration component 214 may select the projected lidar points within the boundaries of the object (e.g., using segmented image 218), and may use the selected lidar points to determine the depth data for the object. These and other examples of techniques used to combine image data with lidar data to determine object depth data can be found, for example, in U.S. patent application Ser. No. 15/970,838, filed May 3, 2018, and titled "Associating Lidar Data And Image Data," which is incorporated by reference herein, in its entirety for all purposes.

The contour generator 108 may use the various data determined by the perception component 106, including object boundary data, associated depth data, and/or object class data, to determine a bounding contour for the object as described above. In various implementations, the contour generator 108 may use various different techniques to generate bounding contours for an object. As shown in this example, the contour generator 108 may include an image-based contour component 224, a lidar-based contour component 226, and a hybrid contour component 228. As described in more detail below, the image-based contour component 224 may be configured to generate bounding contours for detected objects using image data and without additional sensor data such as lidar and radar data. In contrast, the lidar-based contour component 226 may be configured to generate bounding contours based on lidar data. The hybrid contour component 228 may be configured to generate bounding contours based on a combination of lidar data and image data. Various techniques used by these components to generate bounding contours based on image and/or lidar data are described in more detail below in reference to FIGS. 4-6.

In some examples, any or all of the components 224-228 may individually generate bounding contours 230 for an object detected in the environment. When multiple bounding contours 230 are generated for an object (e.g., a first contour from the image-based contour component 224 and a second contour from the lidar-based contour component 226), the contour generator 108 may combine (e.g., aggregate and/or merge) the separate bounding contours. In other examples, the contour generator 108 may evaluate the individual bounding contours 230 to select a most accurate contour, which may be an image-based contour, a lidar-based contour, or a hybrid contour generated based on a combination of image data and lidar data.

Figure 3:
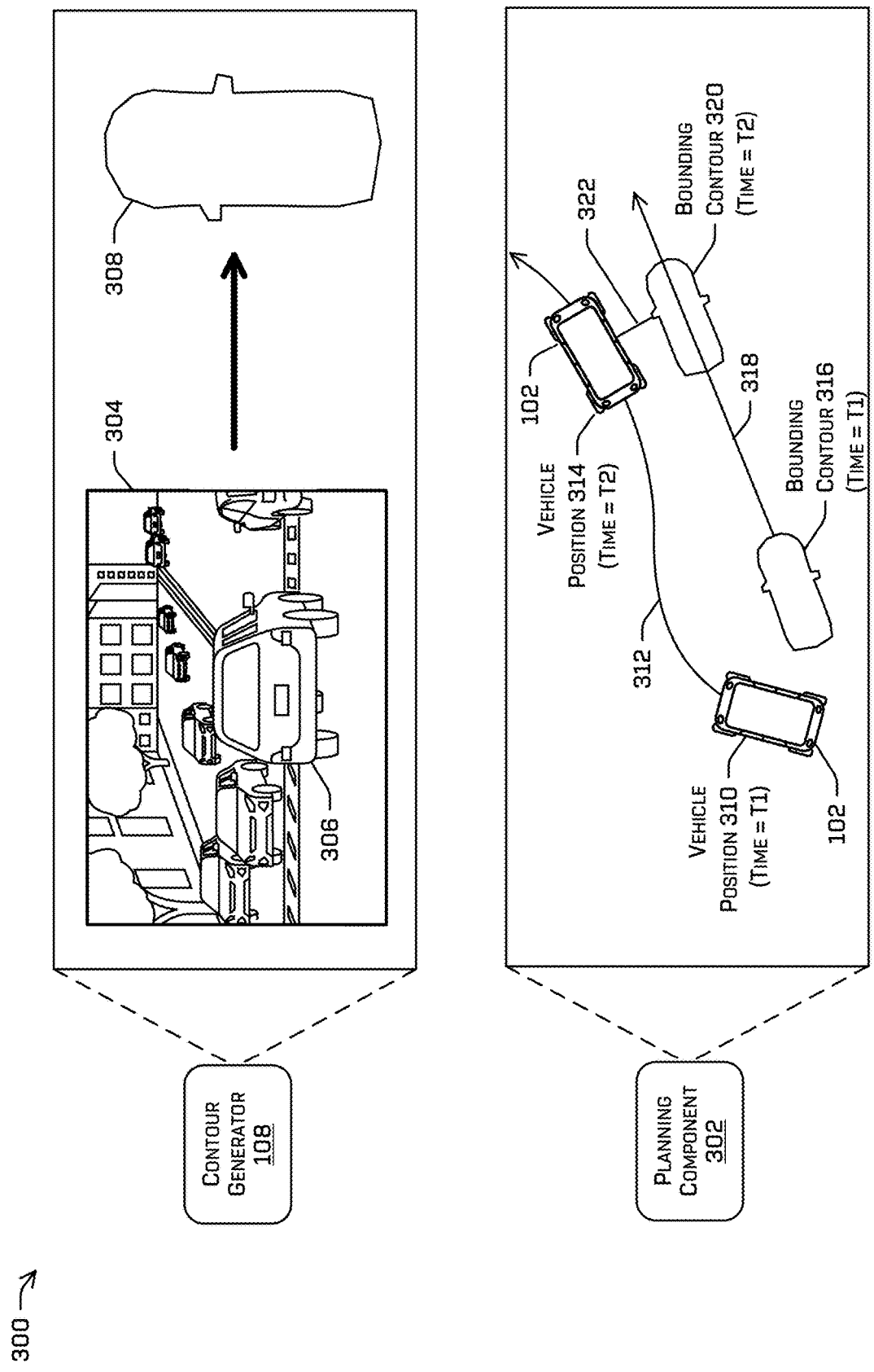
FIG. 3 illustrates an example driving scenario in which an autonomous vehicle generates a bounding contour for a dynamic object, and determines a vehicle trajectory based on the bounding contour and the trajectory of the dynamic object, in accordance with one or more implementations of the disclosure.

FIG. 3 shows an example technique 300 in which an autonomous vehicle detects a dynamic object (e.g., another vehicle) and determines a vehicle trajectory based on the bounding contours and the trajectory of the dynamic object. As noted above, an autonomous vehicle 102 may use the bounding contours determined for objects in the environment to control the operation of the autonomous vehicle in various ways. For instance, an autonomous vehicle 102 may determine safer and more efficient vehicle trajectories and/or routes, by analyzing the bounding contours for detected objects and determining the future positions, poses, and trajectories of the object with respect to the bounding contours. As shown in this example, the autonomous vehicle may use a contour generator 108 (and/or perception component 106) to perceive a driving environment 304, detect another vehicle 306 in the environment, and generate a bounding contour 308 for the other vehicle 306. To generate the bounding contour 308, the contour generator 108 may use any combination of the techniques described herein. Additionally, in this example the autonomous vehicle uses a planning component 302 to determine a trajectory to follow through the environment, based on the predicted trajectory, position, and bounding contour of the other vehicle.

As shown in this example, the driving environment 304 depicts a scene in which another object (e.g., vehicle 306) may be operating. Although the object is a vehicle 306 in this example, in other examples bounding contours may be generated for any type of static object or dynamic object detected within the driving environment 304. For example, static objects may include trees, buildings, signs, traffic signals, and the like. Example dynamic objects may include vehicles, pedestrians, animals, and the like. In some examples, dynamic objects like vehicle 306 may be moving at particular times and may be stopped at other times, such as when vehicle 306 is parked or stopped at a traffic light.

FIG. 3 also depicts the bounding contour 308 associated with vehicle 306. The bounding contour 308 may be created, for example, using any of the systems and methods discussed herein, including techniques based on image data, lidar data, or various combinations of the techniques. As noted above, the bounding contour 308 may be associated with an outer perimeter of vehicle 306. As shown in this example, the bounding contour 308 may be a closed shape representing the entire perimeter of vehicle 306, even when only a portion of the outer surface of vehicle 306 is visible to the autonomous vehicle. For instance, in some cases the perception component 106 and/or contour generator 108 may classify the object (e.g., as a mid-size 4-door crossover vehicle), and may use the object type/class along with the depth data for the visible portion of vehicle 306, to determine predicted depth data for the entire outer surface of vehicle 306. As discussed herein, the bounding contour 308 may be used to plan routes/trajectories for the autonomous vehicle that may avoid collisions and maintain a safe distance from vehicle 306. In some examples, the bounding contour 308 can be used in combination with a bounding box (e.g., a rectangular box associated with vehicle 306), both of which may provide information associated with vehicle 306.

As noted above, bounding contour 308 may provide a better representation of the shape of vehicle 306 than would a bounding box. For instance, bounding boxes may be rectangular, and since a bounding box may be expanded to include all portions of vehicle 306 then the basic rectangular shape might not accurately represent vehicle 306. In contrast, bounding contour 308 may be a many-sided polygon (e.g., with five or more sides) or freeform shape created to follow the outer edges of vehicle 306, including any irregularities (e.g., side mirrors, flags, antennae, overhanging loads, etc.). By using a tight-fitting polygon or freeform shape, the bounding contour 308 may provide a more accurate representation of the shape of the object than would a rectangular bounding box. In some examples, a bounding contour 308 may be implemented as a polygon having five or more sides (or boundary edges), as described in more detail in U.S. patent application Ser. No. 17/138,710, filed Dec. 30, 2020, and titled "Collision Avoidance Using An Object Contour," which is incorporated by reference herein for all purposes.

In some examples, the bounding contour 308 may be used when generating or validating a trajectory of the autonomous vehicle for a possible interaction (e.g., collision or near-miss collision) with vehicle 306. As shown in this example, a vehicle trajectory 312 for an autonomous vehicle 102 may follow a planned driving path through the environment from a first vehicle position 310 at a first time, to a second vehicle position 314 at a second time. In FIG. 3, a first bounding contour 316 associated with vehicle 306 is displayed for the first time, and based on a predicted trajectory 318 of vehicle 306, a second bounding contour 320 associated with vehicle 306 is displayed for the second time. For a potential vehicle trajectory 312, the autonomous vehicle 102 may determine, at any point on the trajectory, a distance between the autonomous vehicle 102 and the bounding contour associated with vehicle 306 at that time. For instance, when determining and evaluating the trajectory 312 as a potential trajectory, the autonomous vehicle 102 may calculate the distance 322 at the second time (e.g., Time=$T_2$) between the autonomous vehicle 102 and the bounding contour 320 at their nearest edges. As shown in this example, the nearest edge of the bounding contour at Time=$T_2$ may be the driver-side mirror. If the distance 322 meets or exceeds a minimum safe distance threshold, then the autonomous vehicle 102 may determine that the potential trajectory 312 is sufficiently safe at Time=$T_2$.

Figure 4:
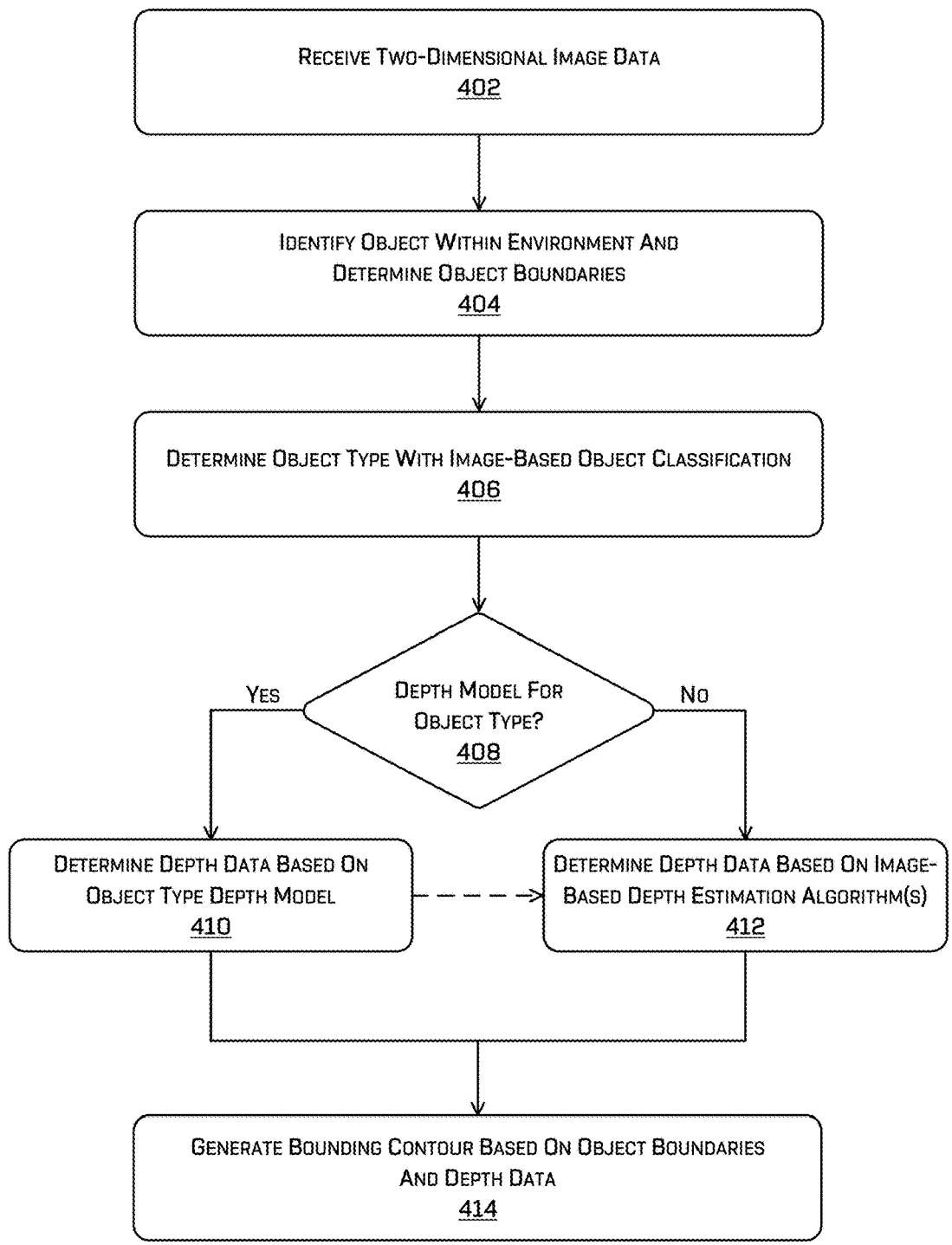
FIG. 4 is a flow diagram illustrating an example process of generating a bounding contour associated with an object in an environment, based on image data, in accordance with one or more implementations of the disclosure.
Figure 5:
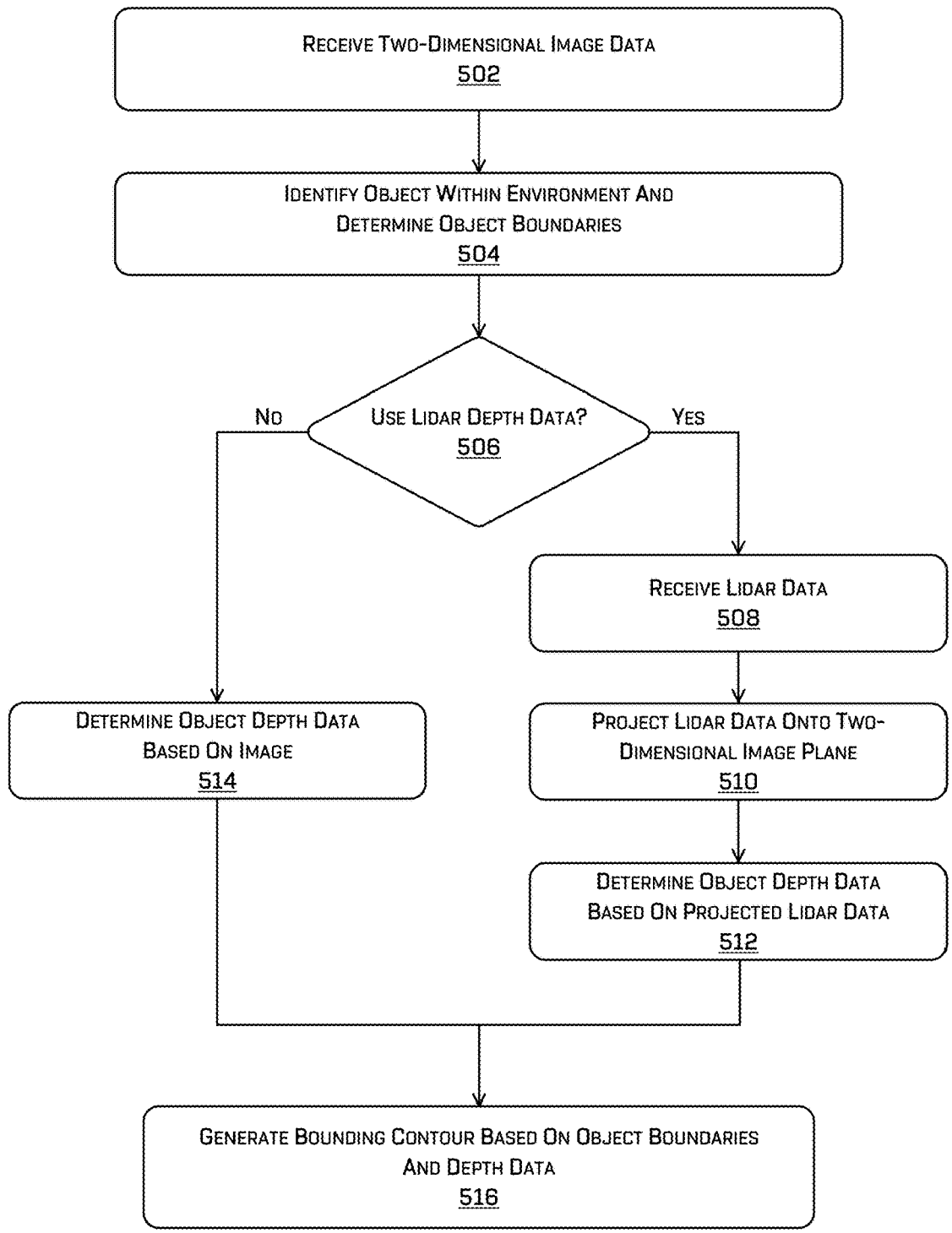
FIG. 5 is a flow diagram illustrating an example process of generating a bounding contour associated with an object in an environment, based on image data and/or lidar data, in accordance with one or more implementations of the disclosure.
Figure 6:
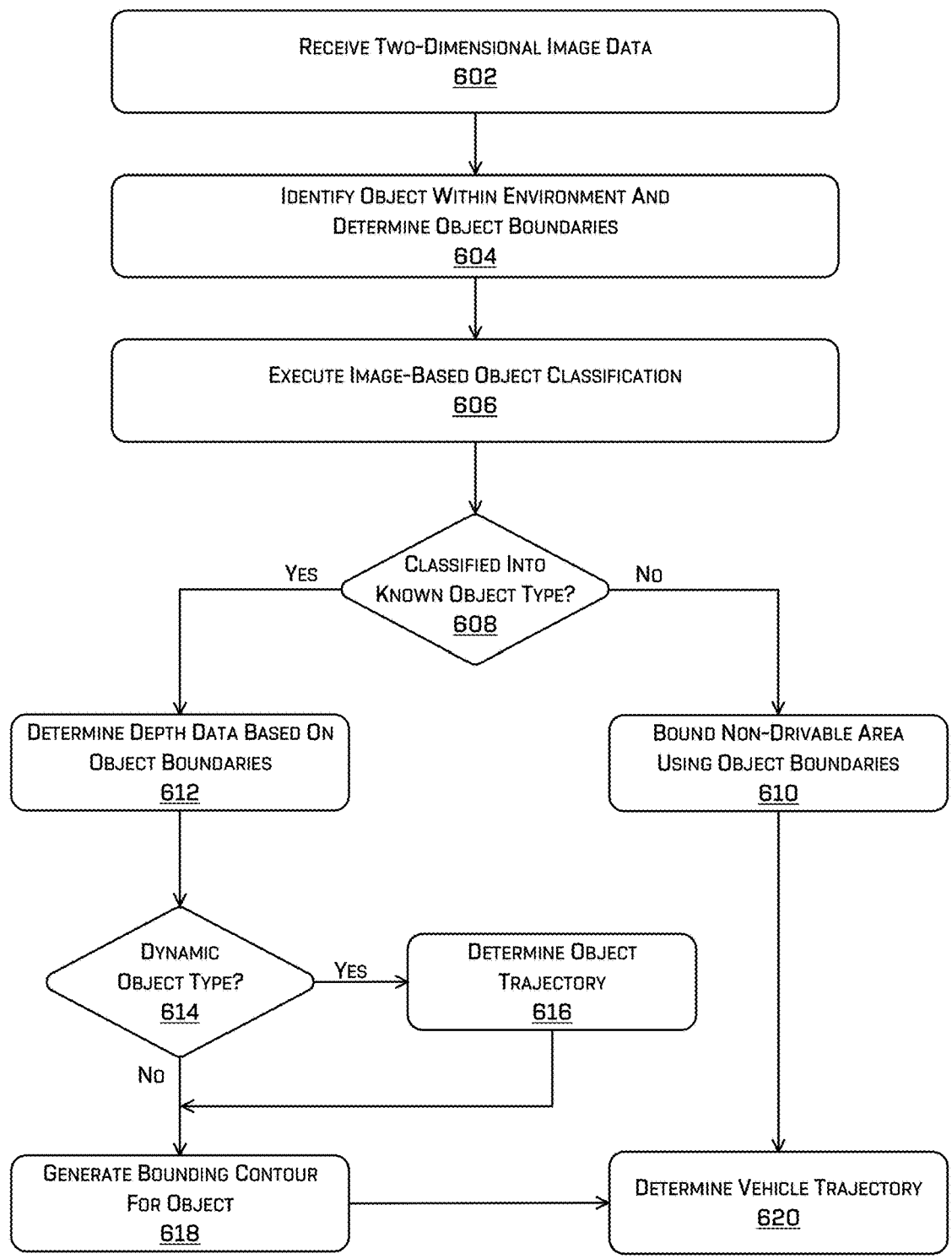
FIG. 6 is a flow diagram illustrating an example process of determining a vehicle trajectory based on one or more bounding contours and/or bounded non-drivable areas associated with objects in an environment, in accordance with one or more implementations of the disclosure.

FIGS. 4-6 are flow diagrams depicting various techniques to generate bounding contours based on image and/or lidar data. For example, FIG. 4 is a flow diagram depicting a process 400 of using image data to generate a bounding contour associated with an object detected in an environment. FIG. 5 is another flow diagram depicting a process 500 of using a combination of image data and/or lidar data to generate a bounding contour associated with a detected object. FIG. 6 is an additional flow diagram depicting a process 600 of using bounding contours and/or bounded non-drivable areas associated with objects, to determine a vehicle trajectory within an environment.

As described below, processes 400, 500, and/or 600 may be performed by one or more computer-based components configured to implement the functionalities of a perception component 106 and/or a contour generator 108 described herein. For instance, process 400 may be performed by an image-based contour component 224, and process 500 may be performed by a lidar-based contour component 226 and/or a hybrid contour component 228. In some examples, the perception component 106 and/or a contour generator 108 may be used in conjunction with various other components of the autonomous vehicle (e.g., prediction, planning, localization, etc.) to predict object positions and trajectories, determine routes for the autonomous vehicle, etc. Additionally, although not shown in FIGS. 4-6, any or all of processes 400, 500, and/or 600 may include controlling the autonomous vehicle based on the outputs of these processes. For instance, based on the bounding contours generated from processes 400 and/or 500, an autonomous vehicle may generate a trajectory for traversing an environment, activate a secondary vehicle controller or vehicle safety system, control a remote teleoperations computing device, engage or disengage autonomous driving features, and the like. In still other examples, a perception component 106 and/or contour generator 108 may be integrated into other types of moving vehicles, mobile devices, image analysis systems, security and surveillance systems, and/or other computer-based systems configured to generate bounding contours based on objects detected in various other environments.

Process 400, 500, and 600 are illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

In process 400, a perception component 106 and/or contour generator 108 may be used to determine a bounding contour for an object in an environment, using image sensor data captured from the environment. In some examples, process 400 may detect and classify an object, determine depth data associated with the object, and generate a bounding contour for the object, based on image data and without using additional sensor data such as lidar and radar data. In other examples, process 400 may include using additional sensor data to detect and classify objects, determine object depth data, etc.

At operation 402, the perception component 106 may receive 2D image data representing an environment. For instance, the 2D image data may include data captured by a camera of an autonomous vehicle traversing an environment. As discussed above, the 2D image data may include representations of various static and dynamic objects within the environment, including but not limited to other vehicles, cyclists, pedestrians, buildings, road features, traffic signs, signals, etc.

At operation 404, the perception component 106 may identify an object within the image data and determine the boundaries of the object within the 2D image plane. In some examples, the perception component 106 may execute one or more segmentation processes (e.g., neural networks or algorithms configured to perform semantic or instance segmentation, etc.) or other object detection algorithms. In some cases, the perception component 106 may initially identify a bounding box or region of interest associated with the object, and then may use additional image analyses techniques to determine the object boundaries in the 2D image. Identifying the object and determining the object boundaries in operation 404 also may use segmentation CNNs in some cases, configured to receive light and/or color image data, thereby providing higher resolution (e.g., per pixel) and more precise boundary determinations than may be determined with other sensor data.

At operation 406, the perception component 106 may perform an image-based classification on the image data to determine one or more object types. In some cases, the classification may be performed on the portion of the 2D image within the boundary region determined in operation 404. One or more different object classification techniques may be used, including trained CNNs or other image-based object classification models, networks, or algorithms configured to classify objects based on visual input, and/or any other object classification techniques described herein. The object type(s) determined in operation 406 may include one or more object types or subtypes (which may include any of the types of objects described herein) and/or may include object attributes (e.g., static or dynamic, drivable or undrivable, symmetrical or asymmetrical, etc.).

At operation 408, the contour generator 108 may determine whether an object depth model is available based on the object type(s) determined in operation 406. As discussed above, an object depth model may include a 3D representation and/or any other depth data associated with an object type. For instance, in the example driving scenario 100 shown in FIG. 1, the contour generator 108 may store an object depth model associated with a traffic cone object type, one or more vehicle object types, a fire hydrant object type, a box object type, and so on. Object depth models may include 3D representations and/or other depth data (e.g., size data including per-dimension maxima/minimum and distributions, size ratios, shape data, models, indicators of symmetry about one or more axes, etc.). In various examples, object depth models may be developed and/or stored locally on the autonomous vehicle 102, or elsewhere on remote computing devices.

When an object is successfully classified into an object type in operation 406, and the contour generator 108 determines that an object depth model is available for the object type (e.g., stored locally or retrievable from a remote system) (408:Yes), then in operation 410 the contour generator 108 may use the object depth model to determine depth data for the object. As described above, the contour generator 108 may retrieve the object depth model for the object type, and use the depth model to determine depth data for the object. For instance, the contour generator 108 may use size data for an observable portion of the object (e.g., the height in pixels of a traffic cone or fire hydrant, the width in pixels of a bicycle or basketball, etc.), and may use the size data to properly scale the depth model and determine an accurate 3D representation of the object. Additionally or alternatively, the contour generator 108 may use another source of depth data (e.g., a lidar point cloud, an image-based depth estimation algorithm) to determine depth data points on one or more observable surfaces of the object, which may be used to configure the depth model and provide accurate depth data for the non-observable surfaces of the object.

In contrast, when object classification (in operation 406) is not performed, or when the object classification does not successfully classify the object into an object type (e.g., unknown road debris) (408:No), then in operation 412 the contour generator 108 may determine depth data for the object using one or more image-based depth estimation techniques. Additionally, as indicated by the dotted line connecting operations 410 and 412, in some cases when an object depth model is available for the object type (408:Yes), then in addition to performing operation 410, the contour generator 108 also may determine depth data for the object using the image-based depth estimation techniques in operation 412. As described above, the contour generator may include one or more image-based per pixel depth estimation algorithms configured to determine depth data from an input image. Examples of various techniques for training and using image-based per pixel depth estimation algorithms can be found, for example, in U.S. patent application Ser. No. 17/390,174, filed Jul. 30, 2021, and titled "Three-Dimensional Point Clouds Based On Images And Depth Data," which is incorporated by reference herein, in its entirety for all purposes. In some examples, the depth data for an object determined in operation 412 may be based entirely on image data, while in other examples operation 412 may include using any combination of multiple different techniques (e.g., depth models, image-based depth estimation algorithms, lidar point clouds, radar, time-of-flight sensors, etc.).

At operation 414, the contour generator 108 may use the object boundaries determined in operation 404, and the corresponding object depth data determined in operations 410 and/or 412, to generate a bounding contour associated with the object. As described above, in some examples the contour generator 108 may use the depth data to identify the widest points around the circumference of the object, and may generate a top-down bounding contour representing an outline around the outer perimeter of the object.

In process 500, the perception component 106 and/or contour generator 108 may be used to determine a bounding contour for an object in an environment, using image sensor data and/or lidar depth data. Various operations within process 500 may be similar or identical to the corresponding operations in process 400. However, in some examples process 500 may use a lidar (e.g., lidar point clouds), or a combination of lidar and image data to determine the bounding contours for objects detected in the environment.

At operation 502, the perception component 106 may receive 2D image data representing an environment. In some examples, operation 502 may be similar or identical to operation 402 described above, in which one or more cameras of an autonomous vehicle may capture image data while the autonomous vehicle is traversing an environment. At operation 504, the perception component 106 may identify an object within the environment using the image data, and determine the boundaries of the object within the 2D image plane. Operation 504 may be similar or identical to operation 404 described above. In various examples, object detection and/or segmentation techniques may be used, including trained CNNs, deep learning algorithms, or heuristics-based algorithms. Additionally, in some cases operation 504 may be performed based entirely on image data, while in other cases the techniques in operation 504 may be based on a combination of image data and/or other types of sensor data.

At operation 506, the contour generator 108 may determine whether or not lidar data is to be used as a source of depth data for the object. The determination of whether or not lidar is to be used may be based on various factors, including whether or not the autonomous vehicle 102 includes lidar sensors, whether the lidar sensors have captured lidar data (e.g., lidar point clouds) representing the object, whether the object type and/or object depth data can be determined with sufficient confidence using image-based techniques (e.g., such as the techniques described in operations 406, 410, and 412), and so on. In some cases, the contour generator 108 may initially attempt to determine an object type using image-based classification, and if the object cannot be classified then lidar may be retrieved and processed for the object.

If the contour generator 108 determines that lidar data is to be used as a source for the object depth data (506:Yes), then in operation 508 the contour generator 108 retrieves lidar data representing the object. As described above, the lidar data may include one or more lidar point clouds. At operation 510, the contour generator 108 may project the lidar data (e.g., point cloud(s)) onto the 2D plane associated with the image data received in operation 502. At operation 512, the contour generator 108 may determine the depth data for the object based on the projected lidar data. For instance, after projecting a lidar point cloud onto the 2D image plane, the contour generator 108 may compare the positions of each projected lidar point to the boundary region determined in operation 504. The contour generator 108 may select the projected lidar points within the boundary region, and use those points to determine the depth data at various points along the object surface.

In contrast, if the contour generator 108 determines that lidar data is not to be used as a source for the object depth data (506:No), then at operation 514 the contour generator 108 may retrieve and/or determine depth data using one or more of the image-based depth data techniques. For instance, operation 514 may include any combination of the image-based depth data techniques described above in operations 406, 410, and/or 412.

At operation 516, the contour generator 108 may use the object boundaries determined in operation 504, and the corresponding object depth data determined in operations 512 and/or 514, to generate a bounding contour associated with the object. In some examples, operation 516 may be similar or identical to operation 414, described above. Additionally, although operation 514 is depicted in this example as an alternative workflow path to operations 508-512, in other examples the contour generator 108 may perform both workflow paths. For instance, as described above, the contour generator 108 may use an image-based contour component 224 in operation 514 to determine object depth data based on image data and without additional sensor data such as lidar and radar data, while also using a lidar-based contour component 226 to determine object depth data based on lidar data in operations 508-512. In some cases, separate bounding contours may be generated based on image depth data and lidar depth data. Additionally or alternatively, the contour generator 108 may use a hybrid contour component 228 to generate a bounding contour based on combined lidar depth data and image-based depth data.

In process 600, the perception component 106 and/or contour generator 108 may be used to determine a vehicle trajectory for an autonomous vehicle 102, based on determining bounding contours and/or bounded non-drivable areas associated with objects detected in the environment. At operation 602, the perception component 106 may receive 2D image data representing an environment. In some examples, operation 602 may be similar or identical to operation 402 and/or operation 502 described above. For instance, in operation 602 one or more cameras of an autonomous vehicle 102 may capture image data of the environment.

At operation 604, the perception component 106 may identify an object within the environment using the image data, and may determine the boundaries of the object within the 2D image plane. Operation 604 may be similar or identical to operation 404 and/or operation 504 described above. At operation 606, the perception component 106 may perform one or more object classification techniques based on the image data (and/or additional sensor data) to determine one or more object types associated with the object. Operation 604 may be similar or identical to operation 406 described above. In various implementations of operations 604 and 606, the perception component 106 may use the image data (e.g., visual per pixel data) and/or additional types of sensor data captured in the environment. Based on the sensor data, the perception component 106 may invoke one or more models, neural networks, and/or algorithms to perform object detection, segmentation, and classification, such as trained CNNs, deep learning algorithms, heuristics-based algorithms, etc.

At operation 608, the perception component 106 and/or contour generator 108 may determine whether the object was successfully classified into a known object type in operation 606. Operation 608 may be similar or identical to operation 408 in some examples. For instance, an object classification component may be configured to analyze sensor input data and determine object types and corresponding classification confidence levels. Object types such as vehicles, bicycles, pedestrians, animals, traffic cones, lane markers, construction objects, sports equipment, furniture, and any other object types described herein may be successfully classified by the perception component 106 (608:Yes), or may not be successfully classified (608:No) in the event of distance objects, partially obscured objects, irregular objects, and/or other object classification failures. Additionally, certain objects may be unclassified and/or unclassifiable (608:No), such as road debris, potholes, garbage, etc.

When the object is not classified into a known object type (608:No), then at operation 610, the contour generator 108 may bound the region associated with the object using the object boundaries determined in operation 604. As shown in this example, the contour generator 108 may designate the bound region as undrivable, but need not generate a bounding contour for the unclassified object. However, in other examples, the contour generator 108 may determine depth data (e.g., using lidar) and generate bounding contours for unclassified/unclassifiable objects.

In contrast, when the object is classified into a known object type (608:Yes), then at operation 612, the contour generator 108 may determine depth data associated with the object. As described above, the contour generator 108 may use one or more depth data techniques, including but not limited to object depth models, image-based depth estimation algorithms, lidar point clouds, radar, time-of-flight sensors, and the like, to determine depth data for points within the object boundaries determined in operation 804.

At operation 614, the contour generator 108 may determine whether the object is a dynamic object, such as a vehicle, motorcycle, bicycle, pedestrian, animal, and the like. Additional dynamic objects may include any object capable of movement, including non-sentient objects such as tumbleweeds, sports equipment such as balls or helmets, lightweight bag, papers, or garbage, etc.). If the object is associated with a dynamic object type (614:Yes), then in operation 616 the contour generator 108 may determine a trajectory for the dynamic object. In some cases, the contour generator 108 may invoke a prediction component configured to predict trajectories for dynamic objects based on the characteristics of the objects and the environment.

In operation 618, for either a static or dynamic object, the contour generator 108 may determine a bounding contour associated with the object. In various examples, operation 618 may be similar or identical to operations 414 and/or operation 516. As discussed above, the contour generator 108 may use the object boundaries determined in operation 604, and the corresponding object depth data determined in operation 612, to generate a bounding contour associated with the object. In some cases, the generation of a bounding contour may be independent of the determination of whether the object is static or dynamic. Accordingly, operation 618 may be performed before or in parallel with operations 614 and 616 in some cases. However, in other examples, different techniques may be used for generating a bounding contour in operation 618 based on whether the object is static or dynamic. For instance, the contour generator 108 may retrieve and use different sources of depth data for the bounding contours of static versus dynamic objects, and/or may generate fully closed bounding contours for dynamic objects and partial or open contours for static objects.

In operation 620, the autonomous vehicle (e.g., a planning component 302) may use the bounding contour determined in operation 618, and/or the bounded region determined in operation 610, to generate and/or validate a trajectory for the autonomous vehicle to use to navigate the environment. As discussed above in reference to FIG. 3, a vehicle trajectory may define a planned driving path through the environment. The planning component 302 may use the bounding contours of objects and/or bounded undrivable regions determined by the contour generator 108, to determine a safe and efficient route for the autonomous vehicle through the environment. During the generation and evaluation of potential trajectories (e.g., possible trajectories or proposed trajectories), the prediction component and/or planning component may calculate a predicted distance between the autonomous vehicle and the nearest point on a bounding contour and/or bounded undrivable region at multiple different points in the potential trajectory, to verify the safety of the trajectory in navigating the environment.

Figure 7:
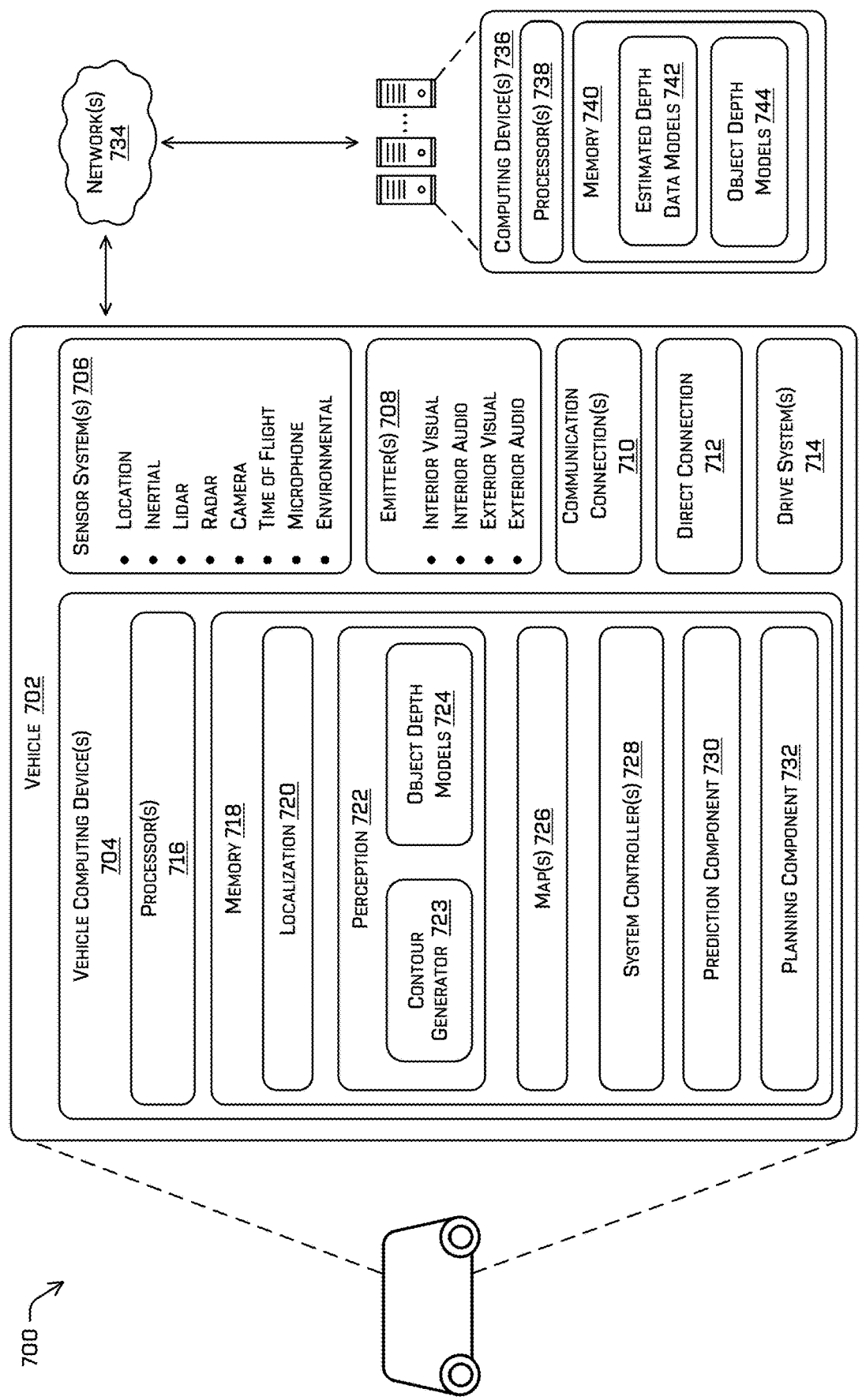
FIG. 7 depicts a block diagram of an example system for implementing various techniques described herein.

FIG. 7 depicts a block diagram of an example system 700 for implementing various techniques described herein. The system 700 can include a vehicle 702, which can correspond to an autonomous or semi-autonomous vehicle configured to perform various techniques described herein for object perception and prediction functionality, route planning and/or optimization. For instance, vehicle 702 may include components configured to detect objects in an environment, use image and/or lidar data to determine bounding contours associated the objects, as described in the above examples, as well as control the vehicle by determining vehicle trajectories and performing vehicle safety functionality based on the bounding contours. The example vehicle 702 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 702 can be configured to control all functions from start to completion of the trip, including all parking functions, it may or may not include a driver and/or controls for driving the vehicle 702, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

In this example, the vehicle 702 can include vehicle computing device(s) 704, one or more sensor systems 706, one or more emitters 708, one or more communication connections 710, at least one direct connection 712, and one or more drive systems 714.

The vehicle computing device(s) 704 can include one or more processors 716 and memory 718 communicatively coupled with the one or more processors 716. In the illustrated example, the vehicle 702 is an autonomous vehicle; however, the vehicle 702 could be any other type of vehicle or robotic platform. In the illustrated example, the memory 718 of the vehicle computing device(s) 704 stores a localization component 720, a perception component 722, a contour generator 723, object depth models 724, one or more maps 726, one or more system controllers 728, a prediction component 730, and a planning component 732. Though depicted in FIG. 7 as residing in the memory 718 for illustrative purposes, one or more of the localization component 720, the perception component 722, the contour generator 723, the object depth models 724, the maps 726, the system controllers 728, the prediction component 730, and the planning component 732 can additionally, or alternatively, be accessible to the vehicle 702 (e.g., stored on, or otherwise accessible by, memory remote from the vehicle 702).

In at least one example, the localization component 720 can include functionality to receive data from the sensor system(s) 706 to determine a position and/or orientation of the vehicle 702 (e.g., one or more of an x-, y-, z-position, roll, pitch, or yaw). For example, the localization component 720 can include and/or request/receive a map of an environment and can continuously determine a location and/or orientation of the autonomous vehicle within the map. In some instances, the localization component 720 can utilize SLAM (simultaneous localization and mapping), CLAMS (calibration, localization and mapping, simultaneously), relative SLAM, bundle adjustment, non-linear least squares optimization, or the like to receive image data, lidar data, radar data, time of flight data, IMU data, GPS data, wheel encoder data, and the like to accurately determine a location of the autonomous vehicle. In some instances, the localization component 720 can provide data to various components of the vehicle 702 to determine an initial position of an autonomous vehicle for generating a trajectory and/or for determining that an object is proximate to one or more crosswalk regions and/or for identifying candidate reference lines, as discussed herein.

In some instances, and in general, the perception component 722 can include functionality to perform object detection, segmentation, and/or classification. In some examples, the perception component 722 can provide processed sensor data that indicates a presence of an entity that is proximate to the vehicle 702 and/or a classification of the entity as an entity type (e.g., car, pedestrian, cyclist, animal, building, tree, road surface, curb, sidewalk, stoplight, stop sign, unknown, etc.). In additional or alternative examples, the perception component 722 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

As shown in this example, the perception component 722 can include a contour generator 723, which may perform similar or identical functionality to any examples of the contour generator 108 described above. As discussed above, the contour generator 723 may use various image-based and/or lidar-based analysis techniques to determine bounding contours associated with objects encountered by the autonomous vehicle 702 in an environment. In this example, the perception component 722 also may include one or more object depth models 724. Object depth models 724 may include image and lidar-based representations of various object types (e.g., vehicles, bicycles, pedestrians, animals, traffic cones, lane markers, potholes, and other road debris) along with depth models configured to provide associated depth data based on the object type (and/or subtype and attributes) of an object detected in the environment.

The memory 718 can further include one or more maps 726 that can be used by the vehicle 702 to navigate within the environment. For the purpose of this disclosure, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., vectorized information regarding features of an environment, image data projected onto a mesh, individual "surfels" (e.g., polygons associated with individual color and/or intensity)), reflectivity information (e.g., specularity information, retroreflectivity information, BRDF information, BS SRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 726 can include at least one map (e.g., images and/or a mesh).

In some examples, the vehicle 702 can be controlled based at least in part on the maps 726. That is, the maps 726 can be used in connection with the localization component 720, the perception component 722, the prediction component 730, and/or the planning component 732 to determine a location of the vehicle 702, identify objects in an environment, and/or generate routes and/or trajectories to navigate within an environment. In some examples, the one or more maps 726 can be stored on a remote computing device(s), such as within the memory 740 of the computing device(s) 736, and may be accessible to the vehicle 702 via network(s) 734. In some examples, multiple maps 726 can be retrieved from the memory 740, and stored based on, for example, a characteristic (e.g., type of entity, time of day, day of week, season of the year, etc.). Storing multiple maps 726 can have similar memory requirements, but can increase the speed at which data in a map can be accessed.

In at least one example, the vehicle computing device(s) 704 can include one or more system controllers 728, which can be configured to control steering, propulsion, braking, safety, emitters, communication, and other systems of the vehicle 702. These system controller(s) 728 can communicate with and/or control corresponding systems of the drive system(s) 714 and/or other components of the vehicle 702. For example, the planning component 732 may generate instructions based at least in part on perception data generated by the perception component 722 and transmit the instructions to the system controller(s) 728, which may control operation of the vehicle 702 based at least in part on the instructions. In some examples, if the planning component 732 receives a notification that a track of an object was "lost" (e.g., an object no longer appears in perception data and isn't occluded by any other objects), the planning component 732 may generate an instruction to bring the vehicle 702 to a safe stop and/or to transmit a request for teleoperator assistance.

In general, the prediction component 730 can include functionality to generate predicted information associated with objects in an environment. As an example, the prediction component 730 can be implemented to predict locations of a pedestrian proximate to a crosswalk region (or otherwise a region or location associated with a pedestrian crossing a road) in an environment as they traverse or prepare to traverse through the crosswalk region. As another example, the techniques discussed herein can be implemented to predict locations of other objects (e.g., vehicles, bicycles, pedestrians, and the like) as the vehicle 702 traverses an environment. In some examples, the prediction component 730 can generate one or more predicted positions, predicted velocities, predicted trajectories, etc., for such target objects based on attributes of the target object and/or other objects proximate the target object.

In general, the planning component 732 can determine a path for the vehicle 702 to follow to traverse the environment. The planning component 732 can include functionality to determine various routes and trajectories and various levels of detail. For example, the planning component 732 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 732 can generate an instruction for guiding the autonomous vehicle along at least a portion of the route from the first location to the second location. In at least one example, the planning component 732 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 702 to navigate.

In some instances, the planning component 732 can generate one or more trajectories for the vehicle 702 based at least in part on predicted location(s) associated with object(s) in an environment. In some examples, the planning component 732 can use temporal logic, such as linear temporal logic and/or signal temporal logic, to evaluate one or more trajectories of the vehicle 702.

As can be understood, the components discussed herein (e.g., the localization component 720, the perception component 722, the one or more maps 726, the one or more system controllers 728, the prediction component 730, and the planning component 732) are described as divided for illustrative purposes. However, the operations performed by the various components can be combined or performed in any other component. Further, any of the components discussed as being implemented in software can be implemented in hardware, and vice versa. Further, any functionality implemented in the vehicle 702 can be implemented in the computing device(s) 736, or another component (and vice versa).

In at least one example, the sensor system(s) 706 can include time of flight sensors, lidar sensors, radar devices and/or radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 706 can include multiple instances of each of these or other types of sensors. For instance, the time of flight sensors can include individual time of flight sensors located at the corners, front, back, sides, and/or top of the vehicle 702. As another example, the camera sensors can include multiple cameras disposed at various locations about the exterior and/or interior of the vehicle 702. The sensor system(s) 706 can provide input to the vehicle computing device(s) 704. Additionally or alternatively, the sensor system(s) 706 can send sensor data, via the one or more networks 734, to the one or more computing device(s) 736 at a particular frequency, after a lapse of a predetermined period of time, in near real-time, etc.

The vehicle 702 can also include one or more emitters 708 for emitting light and/or sound, as described above. The emitters 708 in this example include interior audio and visual emitters to communicate with passengers of the vehicle 702. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 708 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 702 can also include one or more communication connection(s) 710 that enable communication between the vehicle 702 and one or more other local or remote computing device(s). For instance, the communication connection(s) 710 can facilitate communication with other local computing device(s) on the vehicle 702 and/or the drive system(s) 714. Also, the communication connection(s) 710 can allow the vehicle to communicate with other nearby computing device(s) (e.g., other nearby vehicles, traffic signals, etc.). The communications connection(s) 710 also enable the vehicle 702 to communicate with a remote teleoperations computing device or other remote services.

The communications connection(s) 710 can include physical and/or logical interfaces for connecting the vehicle computing device(s) 704 to another computing device or a network, such as network(s) 734. For example, the communications connection(s) 710 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 702 can include one or more drive systems 714. The vehicle 702 can have a single drive system 714, or multiple drive systems 714. In at least one example, if the vehicle 702 has multiple drive systems 714, individual drive systems 714 can be positioned on opposite ends of the vehicle 702 (e.g., the front and the rear, etc.). In at least one example, the drive system(s) 714 can include one or more sensor systems to detect conditions of the drive system(s) 714 and/or the surroundings of the vehicle 702. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 714. In some cases, the sensor system(s) on the drive system(s) 714 can overlap or supplement corresponding systems of the vehicle 702 (e.g., sensor system(s) 706).

The drive system(s) 714 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 714. Furthermore, the drive system(s) 714 also include one or more communication connection(s) that enable communication by the respective drive system with one or more other local or remote computing device(s).

In at least one example, the direct connection 712 can provide a physical interface to couple the one or more drive system(s) 714 with the body of the vehicle 702. For example, the direct connection 712 can allow the transfer of energy, fluids, air, data, etc. between the drive system(s) 714 and the vehicle. In some instances, the direct connection 712 can further releasably secure the drive system(s) 714 to the body of the vehicle 702.

In at least one example, the localization component 720, the perception component 722, the contour generator 723, the object depth models 724, the one or more maps 726, the one or more system controllers 728, the prediction component 730, and the planning component 732 can process sensor data, as described above, and can send their respective outputs, over the one or more network(s) 734, to one or more computing device(s) 736. In at least one example, the respective outputs of the components can be transmitted to the one or more computing device(s) 736 at a particular frequency, after a lapse of a predetermined period of time, in near real-time, etc. Additionally or alternatively, the vehicle 702 can send sensor data to one or more computing device(s) 736 via the network(s) 734, including raw sensor data, processed sensor data and/or representations of sensor data. Such sensor data can be sent as one or more log files to the computing device(s) 736 at a particular frequency, after a lapse of a predetermined period of time, in near real-time, etc.

The computing device(s) 736 can include processor(s) 738 and a memory 740 storing one or more estimated depth data models 742 and/or object depth models 744. As described above, the estimated depth data models 742 may include one or more trained neural networks, machine-learned models, and/or other heuristics-based algorithms configured to determine estimated depth data for individual regions (e.g., pixels) in an image. The object depth models 744 may be similar or identical to the on-vehicle object depth models 724. For instance, the object depth models 744 may include a repository of updated image and lidar-based representations of various object types, along with depth models configured to provide associated depth data based on the object type (e.g., including object subtype and attributes) for objects detected in the environment. Object depth models 744 may include one or more trained neural networks, machine-learned models, and/or other heuristics-based algorithms configured to perform object detection and object categorization/classification (e.g., instance segmentation and/or semantic segmentation), based on 2D image and/or lidar data representing individual regions of interest containing objects in an environment. In various examples, the computing devices 736 may implement one or more machine learning systems or heuristics-based systems to train, test, and optimize the estimated depth data models 742 and/or object depth models 746, based on log data received from vehicle 702 and/or additional vehicles operating within environments. Additionally, any of the features or functionalities described in connection with the contour generator 723 (e.g., various techniques for determining bounding contours for objects based on image and/or lidar analyses, and using the bounding contours to predict object interactions and determine vehicle trajectories etc.) also may be performed by computing devices 736 using heuristics-based techniques and/or neural network models and algorithms. In this example, neural networks are algorithms that pass input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters. Any type of machine learning can be used consistent with this disclosure.

The processor(s) 716 of the vehicle 702 and the processor(s) 738 of the computing device(s) 736 can be any suitable processor capable of executing instructions to process data and perform operations as described herein. By way of example and not limitation, the processor(s) 716 and 738 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 718 and 740 are examples of non-transitory computer-readable media. The memory 718 and 740 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 7 is illustrated as a distributed system, in alternative examples, components of the vehicle 702 can be associated with the computing device(s) 736 and/or components of the computing device(s) 736 can be associated with the vehicle 702. That is, the vehicle 702 can perform one or more of the functions associated with the computing device(s) 736, and vice versa.

EXAMPLE CLAUSES

A. A system comprising: one or more processors; and one or more non-transitory computer-readable media storing computer-executable instructions that, when executed, cause the system to perform operations comprising: receiving image data captured by a camera in an environment, the image data associated with a two-dimensional plane; receiving lidar data captured by a lidar sensor in the environment; determining a boundary of an object within the environment, based at least in part on the image data; determining projected lidar data, by projecting at least a portion of the lidar data onto the two-dimensional plane; determining depth data associated with the object, based at least in part on the projected lidar data; determining a bounding contour associated with the object, based at least in part on the boundary of the object and the depth data; and controlling an autonomous vehicle within the environment, based at least in part on the bounding contour associated with the object.

B. The system as recited in paragraph A, wherein determining the bounding contour associated with the object comprises: determining a boundary edge associated with the object, based at least in part on the image data, wherein the boundary edge has a first endpoint and a second endpoint; determining an interior point in an interior of the boundary edge; and replacing the boundary edge with: a first segment based on the first endpoint and the interior point; and a second segment based on the interior point and the second endpoint, wherein the first segment and the second segment are based at least in part on the depth data.

C. The system as recited in paragraph A, the operations further comprising:
determining an object type associated with the object, based at least in part on the image data; and determining a depth model associated with the object type, wherein determining the bounding contour is based at least in part on the depth model.

D. The system as recited in paragraph A, the operations further comprising:
determining that the object is associated with a dynamic object type, based at least in part on an image-based object classification; and determining a trajectory associated with the object, based at least in part on the dynamic object type, wherein controlling the autonomous vehicle is based at least in part on the trajectory associated with the object.

E. The system as recited in paragraph A, the operations further comprising: providing the image data as input to a depth estimation algorithm; and determining second depth data based at least in part on an output of the depth estimation algorithm, wherein determining the bounding contour is further based at least in part on the second depth data.

F. A method comprising: receiving image data captured by a camera in an environment; detecting an object in the environment, based at least in part on the image data; determining depth data associated with the object, based at least in part on the image data; determining a bounding contour associated with the object, based at least in part on the depth data; and controlling an autonomous vehicle within the environment, based at least in part on the bounding contour associated with the object.

G. The method of paragraph F, wherein determining the bounding contour associated with the object comprises: determining a boundary edge associated with the object, based at least in part on the image data, wherein the boundary edge has a first endpoint and a second endpoint; determining an interior point in an interior of the boundary edge; and replacing the boundary edge with: a first segment based on the first endpoint and the interior point; and a second segment based on the interior point and the second endpoint, wherein the first segment and the second segment are based at least in part on the depth data.

H. The method of paragraph F, further comprising: receiving lidar data captured by a lidar sensor in the environment; and projecting the lidar data onto a two-dimensional plane associated with the image data, wherein determining the depth data is based at least in part on the lidar data.

I. The method of paragraph H, wherein determining the depth data comprises: determining a boundary region associated with the object, based at least in part on the image data; and determining the depth data within the boundary region, based at least in part on the lidar data.

J. The method of paragraph F, further comprising: determining an object type associated with the object, based at least in part on the image data; and determining a depth model associated with the object type, wherein determining the bounding contour is based at least in part on the depth model.

K. The method of paragraph F, wherein determining the depth data comprises: providing the image data as input to a depth estimation algorithm; and determining the depth data based at least in part on an output of the depth estimation algorithm.

L. The method of paragraph F, further comprising: receiving lidar data captured by a lidar sensor in the environment; and determining a second bounding contour associated with the object, based at least in part on the lidar data, wherein controlling the autonomous vehicle is based at least in part on the bounding contour and the second bounding contour.

M. The method of paragraph F, wherein controlling the autonomous vehicle comprises: determining a proposed trajectory for the autonomous vehicle within the environment; determining a point on the bounding contour, based at least in part on a depth model associated with the object, wherein the point is associated with a first surface of the object that is obscured within the image data by a second surface of the object; determining a predicted distance at a future time, between a portion of the autonomous vehicle and the point on the bounding contour, based at least in part on the proposed trajectory; and validating the proposed trajectory based at least in part on the predicted distance.

N. One or more non-transitory computer-readable media storing processor-executable instructions that, when executed by one or more processors, cause the one or more processors to perform operations comprising: receiving image data captured by a camera in an environment; detecting an object in the environment, based at least in part on the image data; determining depth data associated with the object, based at least in part on the image data; determining a bounding contour associated with the object, based at least in part on the depth data; and controlling an autonomous vehicle within the environment, based at least in part on the bounding contour associated with the object.

O. The one or more non-transitory computer-readable media of paragraph N, wherein determining the bounding contour associated with the object comprises: determining a boundary edge associated with the object, based at least in part on the image data, wherein the boundary edge has a first endpoint and a second endpoint; determining an interior point in an interior of the boundary edge; and replacing the boundary edge with: a first segment based on the first endpoint and the interior point; and a second segment based on the interior point and the second endpoint, wherein the first segment and the second segment are based at least in part on the depth data.

P. The one or more non-transitory computer-readable media of paragraph N, the operations further comprising: receiving lidar data captured by a lidar sensor in the environment; and projecting the lidar data onto a two-dimensional plane associated with the image data, wherein determining the depth data is based at least in part on the lidar data.

Q. The one or more non-transitory computer-readable media of paragraph P, wherein determining the depth data comprises:
  determining a boundary region associated with the object, based at least in part on the image data; and determining the depth data within the boundary region, based at least in part on the lidar data.

R. The one or more non-transitory computer-readable media of paragraph N, the operations further comprising: determining an object type associated with the object, based at least in part on the image data; and determining a depth model associated with the object type, wherein determining the bounding contour is based at least in part on the depth model.

S. The one or more non-transitory computer-readable media of paragraph N, wherein determining the depth data comprises: providing the image data as input to a depth estimation algorithm; and determining the depth data based at least in part on an output of the depth estimation algorithm.

T. The one or more non-transitory computer-readable media of paragraph N, the operations further comprising: receiving lidar data captured by a lidar sensor in the environment; and determining a second bounding contour associated with the object, based at least in part on the lidar data, wherein controlling the autonomous vehicle is based at least in part on the bounding contour and the second bounding contour.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood that components or steps discussed with respect to one example or implementation may be used in conjunction with components or steps of other examples.

A non-limiting list of objects in an environment may include but is not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
   one or more processors; and
   one or more non-transitory computer-readable media storing computer-executable instructions that, when executed, cause the system to perform operations comprising:
   receiving image data captured by a camera in an environment, the image data associated with a two-dimensional plane;
   receiving lidar data captured by a lidar sensor in the environment;
   determining a boundary of an object within the environment, based at least in part on the image data;
   determining projected lidar data, by projecting at least a portion of the lidar data onto the two-dimensional plane;
   determining first depth data associated with the object, based at least in part on the projected lidar data;
   providing the image data as input to a depth estimation algorithm;
   determining second depth data based at least in part on an output of the depth estimation algorithm;
   determining a bounding contour associated with the object, based at least in part on the boundary of the object and the first depth data and the second depth data; and
   controlling an autonomous vehicle within the environment, based at least in part on the bounding contour associated with the object.

2. The system as recited in claim 1, wherein determining the bounding contour associated with the object comprises:
   determining a boundary edge associated with the object, based at least in part on the image data, wherein the boundary edge has a first endpoint and a second endpoint;
   determining an interior point in an interior of the boundary edge; and
   replacing the boundary edge with:
   a first segment based on the first endpoint and the interior point; and
   a second segment based on the interior point and the second endpoint, wherein the first segment and the second segment are based at least in part on the first depth data.

3. The system as recited in claim 1, the operations further comprising:
   determining an object type associated with the object, based at least in part on the image data; and
   determining a depth model associated with the object type, wherein determining the bounding contour is based at least in part on the depth model.

4. The system as recited in claim 1, the operations further comprising:
   determining that the object is associated with a dynamic object type, based at least in part on an image-based object classification; and
   determining a trajectory associated with the object, based at least in part on the dynamic object type,
   wherein controlling the autonomous vehicle is based at least in part on the trajectory associated with the object.

5. The system of claim 1, wherein the boundary is a non-rectangular polygon.

6. A method comprising:
   receiving image data captured by a camera in an environment;
   detecting an object in the environment, based at least in part on the image data;
   receiving lidar data captured by a lidar sensor in the environment;
   determining, based on projecting the lidar data, first depth data associated with the object;
   determining, based on inputting the image data to a depth estimation algorithm, second depth data associated with the object;
   determining a bounding contour associated with the object, based at least in part on the first depth data and the second depth data; and
   controlling an autonomous vehicle within the environment, based at least in part on the bounding contour associated with the object.

7. The method of claim 6, wherein determining the bounding contour associated with the object comprises:
   determining a boundary edge associated with the object, based at least in part on the image data, wherein the boundary edge has a first endpoint and a second endpoint;
   determining an interior point in an interior of the boundary edge; and
   replacing the boundary edge with:
   a first segment based on the first endpoint and the interior point; and
   a second segment based on the interior point and the second endpoint, wherein the first segment and the second segment are based at least in part on at least one of the first depth data or the second depth data.

8. The method of claim 6, further comprising:
   projecting, as projected lidar data, the lidar data onto a two-dimensional plane associated with the image data, wherein determining the first depth data is based at least in part on the projected lidar data.

9. The method of claim 8, wherein determining the first depth data comprises:
  determining a boundary region associated with the object, based at least in part on the image data; and
  determining the first depth data within the boundary region, based at least in part on the lidar data.

10. The method of claim 6, further comprising:
  determining an object type associated with the object, based at least in part on the image data; and
  determining a depth model associated with the object type, wherein determining the bounding contour is based at least in part on the depth model.

11. The method of claim 6, further comprising:
  determining the second depth data based at least in part on an output of the depth estimation algorithm.

12. The method of claim 6, further comprising:
  determining a second bounding contour associated with the object, based at least in part on the lidar data,
  wherein controlling the autonomous vehicle is based at least in part on the bounding contour and the second bounding contour.

13. The method of claim 6, wherein controlling the autonomous vehicle comprises:
  determining a proposed trajectory for the autonomous vehicle within the environment;
  determining a point on the bounding contour, based at least in part on a depth model associated with the object, wherein the point is associated with a first surface of the object that is obscured within the image data by a second surface of the object;
  determining a predicted distance at a future time, between a portion of the autonomous vehicle and the point on the bounding contour, based at least in part on the proposed trajectory; and
  validating the proposed trajectory based at least in part on the predicted distance.

14. One or more non-transitory computer-readable media storing processor-executable instructions that, when executed by one or more processors, cause the one or more processors to perform operations comprising:
  receiving image data captured by a camera in an environment;
  receiving lidar data captured by a lidar sensor in the environment;
  detecting an object in the environment, based at least in part on the image data;
  determining, based on projecting the lidar data, first depth data associated with the object;
  determining, based on inputting the image data to a depth estimation algorithm, second depth data associated with the object,
  determining a bounding contour associated with the object, based at least in part on the first depth data and the second depth data; and
  controlling an autonomous vehicle within the environment, based at least in part on the bounding contour associated with the object.

15. The one or more non-transitory computer-readable media of claim 14, wherein determining the bounding contour associated with the object comprises:
  determining a boundary edge associated with the object, based at least in part on the image data, wherein the boundary edge has a first endpoint and a second endpoint;
  determining an interior point in an interior of the boundary edge; and
  replacing the boundary edge with:
    a first segment based on the first endpoint and the interior point; and
    a second segment based on the interior point and the second endpoint, wherein the first segment and the second segment are based at least in part on at least one of the first depth data or the second depth data.

16. The one or more non-transitory computer-readable media of claim 14, the operations further comprising:
  projecting, as projected lidar data the lidar data onto a two-dimensional plane associated with the image data,
  wherein determining the first depth data is based at least in part on the projected lidar data.

17. The one or more non-transitory computer-readable media of claim 16, wherein determining the first depth data comprises:
  determining a boundary region associated with the object, based at least in part on the image data; and
  determining the first depth data within the boundary region, based at least in part on the lidar data.

18. The one or more non-transitory computer-readable media of claim 14, the operations further comprising:
  determining an object type associated with the object, based at least in part on the image data; and
  determining a depth model associated with the object type, wherein determining the bounding contour is based at least in part on the depth model.

19. The one or more non-transitory computer-readable media of claim 14, the operations further comprising:
  determining the second depth data based at least in part on an output of the depth estimation algorithm.

20. The one or more non-transitory computer-readable media of claim 14, the operations further comprising:
  determining a second bounding contour associated with the object, based at least in part on the lidar data,
  wherein controlling the autonomous vehicle is based at least in part on the bounding contour and the second bounding contour.

* * * * *